(12) United States Patent
Akedo et al.

(10) Patent No.: US 8,305,669 B2
(45) Date of Patent: Nov. 6, 2012

(54) OPTICAL SCANNING DEVICE

(75) Inventors: Jun Akedo, Tsukuba (JP); Harumichi Sato, Tsukuba (JP); Jaehyuk Park, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 571 days.

(21) Appl. No.: 12/444,922

(22) PCT Filed: Sep. 26, 2007

(86) PCT No.: PCT/JP2007/068699
§ 371 (c)(1),
(2), (4) Date: Apr. 9, 2009

(87) PCT Pub. No.: WO2008/044470
PCT Pub. Date: Apr. 17, 2008

(65) Prior Publication Data
US 2010/0014140 A1    Jan. 21, 2010

(30) Foreign Application Priority Data

Oct. 12, 2006   (JP) .................................. 2006-279202

(51) Int. Cl.
*G02B 26/08* (2006.01)
(52) U.S. Cl. ................. 359/199.1; 359/198.1; 359/224.1
(58) Field of Classification Search .... 359/199.1–199.4, 359/200.6–200.8, 224.1–224.2
See application file for complete search history.

(56) References Cited

U.S. PATENT DOCUMENTS

| 5,959,760 A | 9/1999 | Yamada et al. | |
| 2006/0245023 A1* | 11/2006 | Akedo et al. | 359/223 |

FOREIGN PATENT DOCUMENTS

| JP | 7-65098 | 3/1995 |
| JP | 7-304208 | 11/1995 |
| JP | 10-104543 | 4/1998 |
| JP | 10-197819 | 7/1998 |
| JP | 10-260372 | 9/1998 |
| JP | 11-52278 | 2/1999 |
| JP | 2000-292735 | 10/2000 |

(Continued)

OTHER PUBLICATIONS

English language Abstract of JP 2000-292735, Oct. 20, 2000.

(Continued)

*Primary Examiner* — James Phan
(74) *Attorney, Agent, or Firm* — Greenblum & Bernstein P.L.C.

(57) ABSTRACT

An optical scanning device of the invention includes: a substrate main body;
two cantilever beam portions which protrude from both-side portions of one side of the substrate main body; a mirror portion whose both-sides are supported by torsion bar portions between the cantilever beam portions; a drive source which causes the substrate main body to oscillate; and a light source which projects light onto the mirror portion, where the mirror portion resonates and vibrates in accordance with a vibration imparted to a substrate by the drive source, and a direction of reflection light from the light projected onto the mirror portion from the light source changes in accordance with the vibration of the mirror portion, and where a fixed end portion of the substrate main body which is located on the opposite side thereof from the mirror portion side is fixed to a supporting component, and the drive source is provided on a portion of the substrate main body.

4 Claims, 23 Drawing Sheets

FOREIGN PATENT DOCUMENTS

JP          2001-4952          1/2001

OTHER PUBLICATIONS

English language Abstract of JP 2001-4952, Jan. 12, 2001.
English language Abstract of JP 11-52278, Feb. 26, 1999.
English language Abstract of JP 10-197819, Jul. 31, 1998.
English language Abstract of JP 10-104543, Apr. 24, 1998.
Jae-Hyuk Park et al., Practical High-Speed Metal-Based Optical Micro scanning Devices with Low Production Cost, Micro Electro Mechanical System, 2006. 01, pp. 730-733.

* cited by examiner a TORSIONAL RESONANCE OF MIRROR PORTION (fm)
b DIVIDED RESONANCE VIBRATION OF FRAME PORTION (fb)

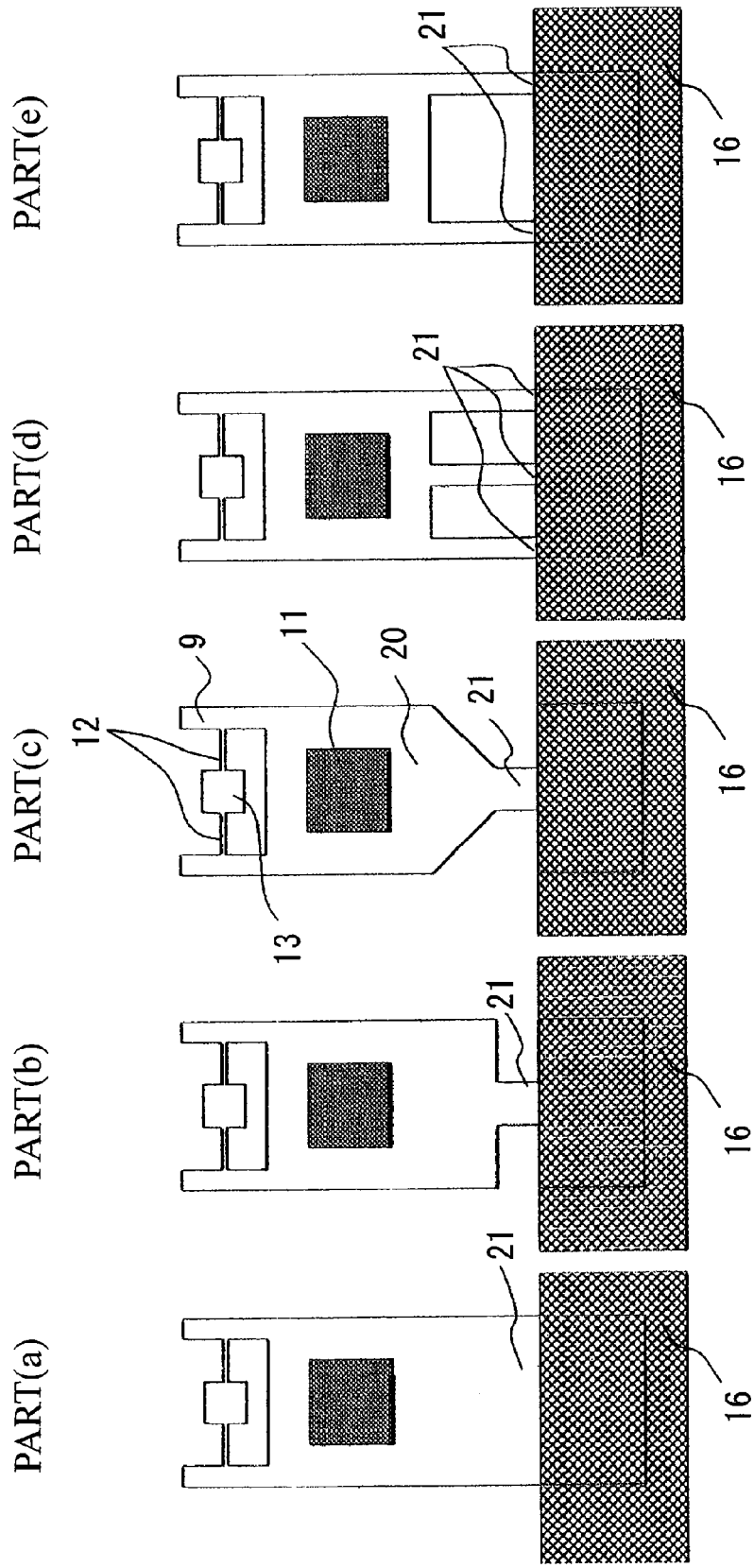

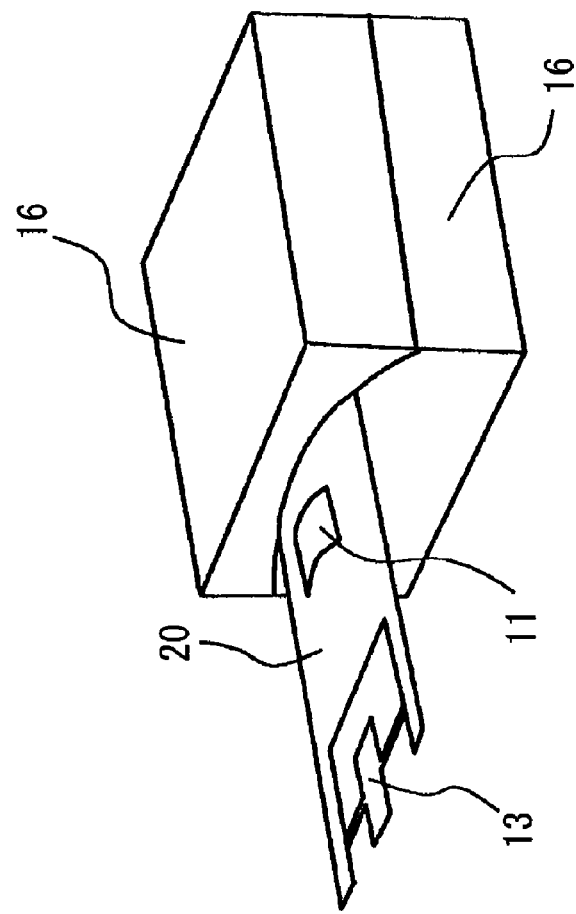
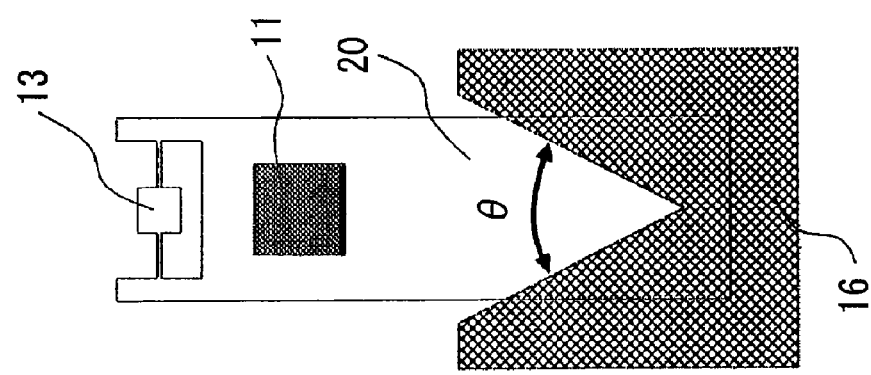
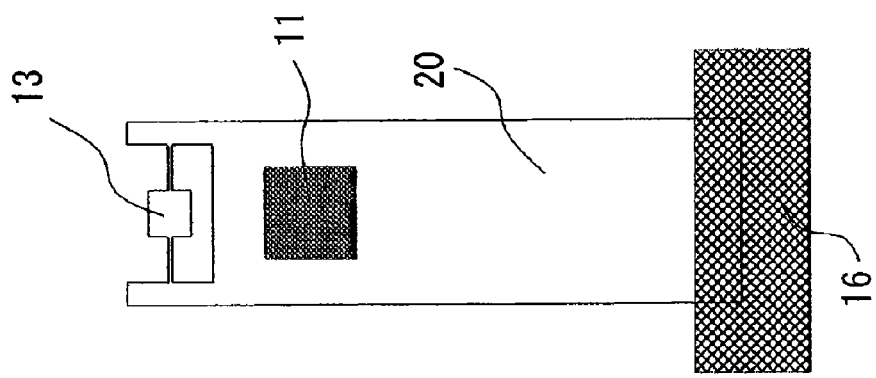

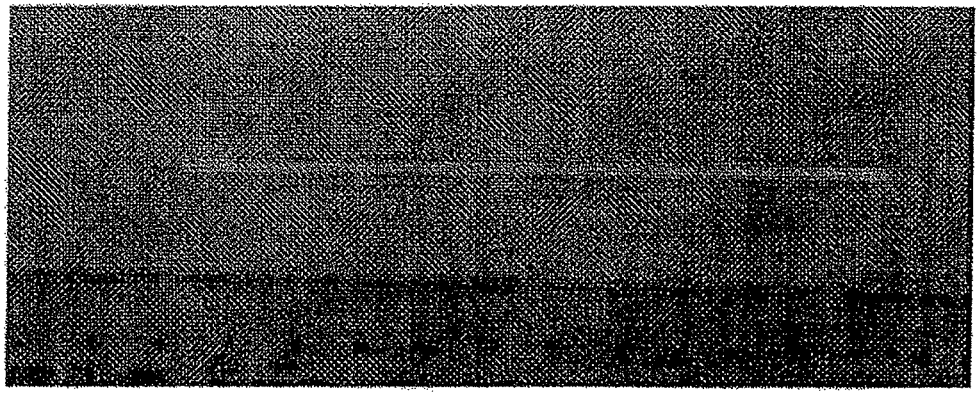
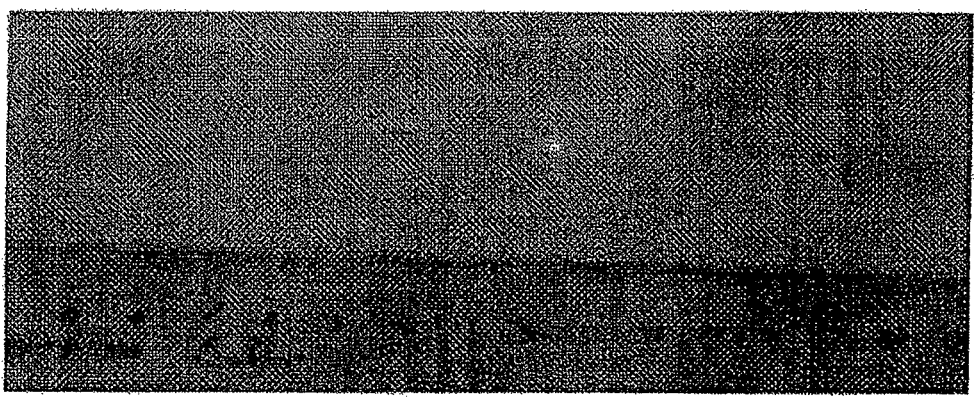
FIG. 13

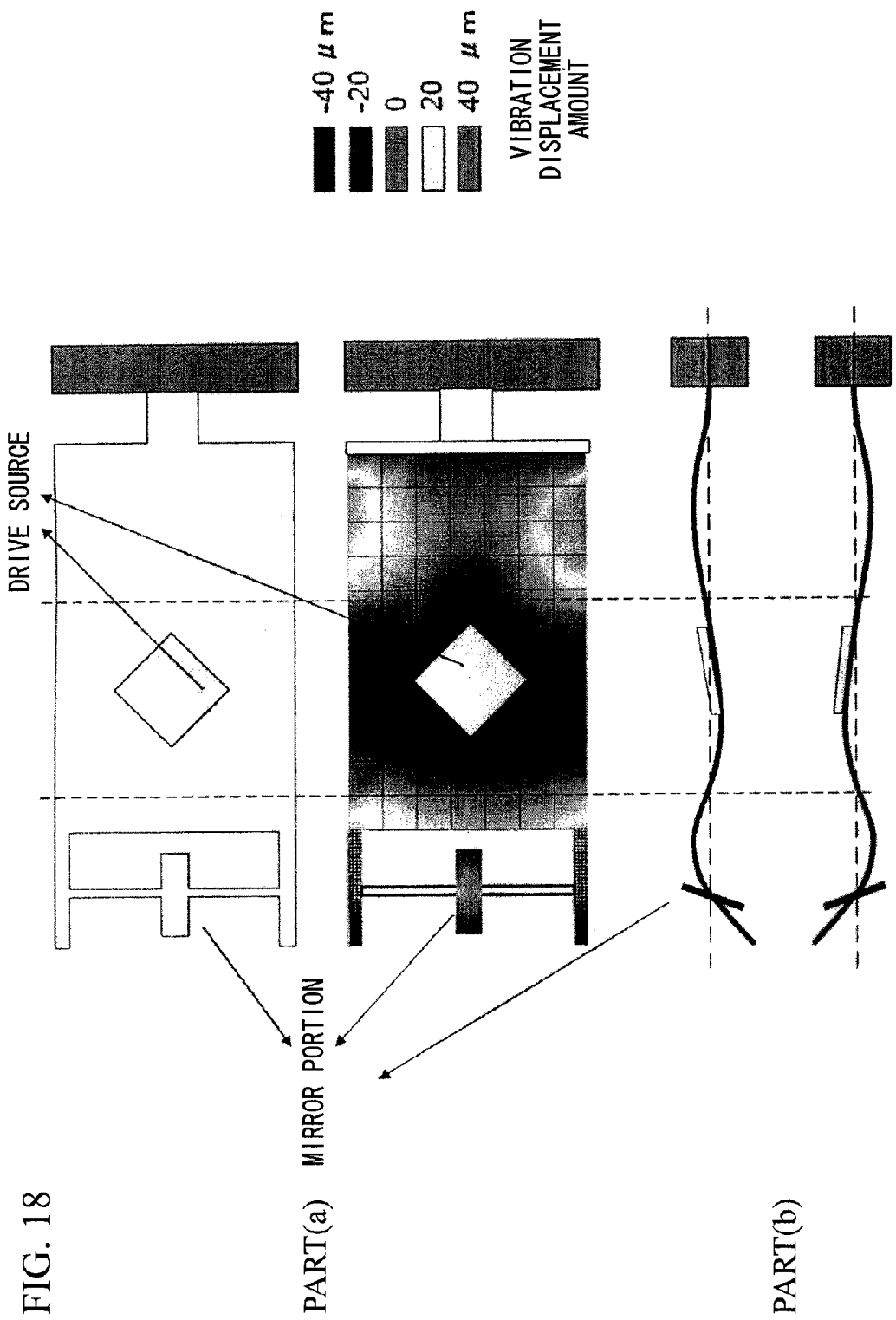

NO CUT MODEL

CUT MODEL

SHORT MODEL

FIG. 22
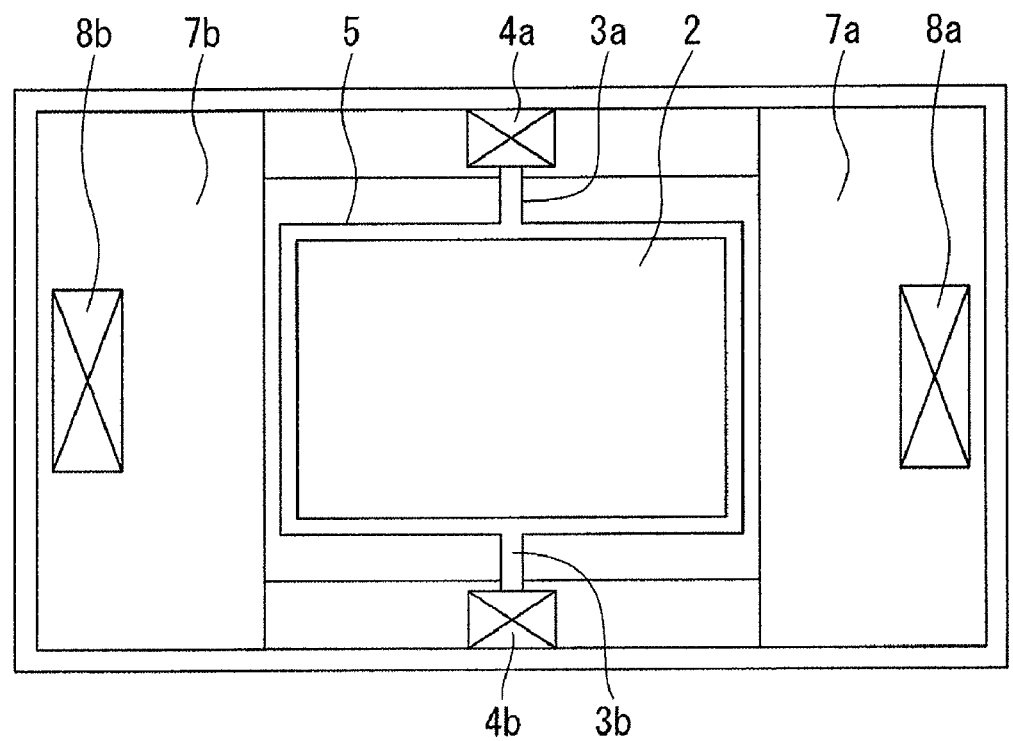
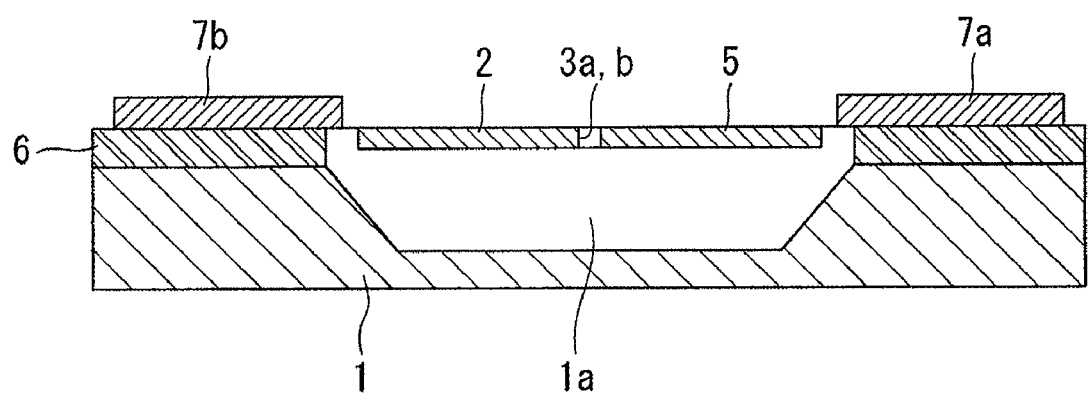

OPTICAL SCANNING DEVICE

BACKGROUND OF THE INVENTION

1. Field of the Invention

The present invention relates to an optical scanner which performs scans by the scanning of an optical beam, and, in particular, to an optical scanning device having a structure in which a micro mirror which is supported by torsion bars is made to oscillate so as to cause the direction of an optical beam to change.

2. Background Art

In recent years, optical scanners which scan optical beams of laser light or the like have been used as optical instruments such as bar code readers, laser printers, and head mounted displays, or as the optical intake devices of input devices such as infrared cameras and the like. Optical scanners having a structure in which a micro mirror obtained via silicon micromachining technology is oscillated have been proposed for this type of optical scanner. For example, FIG. 22 shows an optical scanner having a silicon micro mirror which is disclosed in Japanese Unexamined Patent Application, First Publication No. H11-52278 (Patent document 1, referred to below as 'Conventional technology 1'). This optical scanner is manufactured using silicon micromachining technology and is formed having an overall size of several millimeters square. A supporting substrate 1 is formed as a rectangular thick plate having a recessed portion 1a formed in a center portion thereof. A mirror 2 which is formed from a silicon thin film is internally supported inside this recessed portion 1a. Two torsion bars 3a and 3b which are formed integrally with the mirror 2 protrude from two ends thereof. Distal end portions of these torsion bars 3a and 3b are fixed to the supporting substrate 1, and are connected respectively to pads 4a and 4b. As a result, the mirror 2 is able to be swung between the planar direction of the mirror and a direction which is perpendicular to the mirror surface by the twisting of the torsion bars 3a and 3b. Impurity ions are implanted at least at peripheral areas or at the surface of the mirror 2 so as to become diffused over these areas. Alternatively, these areas may be covered by aluminum or silver or by a conductive organic thin-film resulting in these areas forming an electrode portion 5 which is electrically conductive.

In contrast, fixed electrodes 7a and 7b are located respectively at positions on both sides of the recessed portion 1a on the surface of the supporting substrate 1 via an insulator 6. These fixed electrodes 7a and 7b are formed by semiconductors or from a conductive material which is made from an organic material, and inner side edge portions of each of these fixed electrodes 7a and 7b are placed adjacent to the electrode portion 5 which is located at the edges on 2 sides of the mirror 2. Condensers are formed between the electrode portion 5 and the respective fixed electrodes 7a and 7b.

If a predetermined voltage is applied between a pad 8a of the one fixed electrode 7a and the pads 4a and 4b of the torsion bars 3a and 3b, then this voltage is applied to the mirror electrode portion 5 which is connected to the pads 4a and 4b, and electric charges having mutually opposite polarities are accumulated on the surface of the fixed electrode 7a and the mirror electrode portion 5 so as to form a condenser. Static electricity then begins to work between the fixed electrode 7a and the mirror electrode portion 5, and the mirror 2 starts to rotate. Next, after the mirror 2 has returned to its original position, by then applying voltage between the fixed electrode 7b on the opposite side and the mirror electrode portion 5, the mirror 2 is again rotated, this time in the opposite rotation direction. By performing this type of operation repeatedly, the mirror 2 makes a swinging motion by repeating a motion of rotating between the positions of maximum rotation in the anticlockwise direction and the clockwise direction.

Moreover, as an optical scanner in which a micro mirror obtained by means of silicon micromachining technology is oscillated, the structure described in Japanese Unexamined Patent Application, First Publication No. H10-197819 (Patent document 2) is known (referred to below as 'Conventional technology 2').

As shown in FIG. 23, this optical scanner is provided with a plate-shaped micro mirror 1 which is used to reflect light, a pair of rotation supporting bodies 2 which are positioned on a straight line and support both sides of the micro mirror 1, a frame portion 3 to which the pair of rotation supporting bodies 2 are connected and which surrounds the periphery of the mirror 1, and a piezoelectric element 4 which applies translational motion to the frame portion 3. In addition, this optical scanner is structured such that the center of gravity of the mirror 1 is located at a position outside the straight line connecting together the pair of rotation supporting bodies 2.

When voltage is applied to the piezoelectric element 4, the piezoelectric element 4 is made to expand and contract, so as to vibrate in the Z axial direction. This vibration is transmitted to the frame portion 3. When the micro mirror 1 is made to undergo relative motion relative to the driven frame portion 3 and the vibration component in the Z axial direction is transmitted to the micro mirror 1, because the micro mirror 1 has a left-right asymmetrical mass component relative to the axis formed by the X axis rotation supporting bodies 2, rotational moment is generated in the micro mirror 1 centered on the X axis rotation supporting bodies 2. In this manner, the translational motion which has been applied to the frame portion 3 by the piezoelectric element 4 is transformed into rotational motion centering on the X axis rotation supporting bodies 2 of the micro mirror 1.

Moreover, as shown in FIG. 24, an optical scanning device is also described in Japanese Unexamined Patent Application, First Publication No. H10-104543 (Patent document 3, referred to below as 'Conventional technology 3'). In this optical scanning device, beam portions 3 and 3 extend in mutually opposite directions from both sides of a movable portion 2 in a vibrator 1, and are connected to two arm portions 4 and 4 of a fixed portion 6. Piezoelectric thin films 5 and 5 are provided respectively on the arm portions 4 and 4 of the fixed portion 6, and these piezoelectric thin films 5 and 5 are driven by the same signal which includes higher order vibration frequencies.

The above-described optical scanner of Conventional technology 1 is manufactured to be several millimeters square using silicon micromachining technology, and the electrode portion 5 is formed on at least peripheral areas or on the surface of the mirror 2. In addition, the pads 4a and 4b are provided on the torsion bars 3a and 3b, and it is necessary to place the respective fixed electrodes 7a and 7b and pads 8a and 8b at positions on both sides of the surface of the supporting substrate 1 via the insulator 6.

In this manner, because the electrode portion 5 is formed on at least peripheral areas or on the surface of the mirror 2, and the pads 4a and 4b are formed on the torsion bars 3a and 3b, and the respective fixed electrodes 7a and 7b and pads 8a and 8b are formed at positions on both sides of the surface of the supporting substrate 1 via the insulator 6, the manufacturing of this optical scanning device is complex, and not only have the causes for possible failures increased, but the time required for manufacturing has also increased. Accordingly, there is a problem in that cost increases.

Moreover, in the optical scanner of the above-described Conventional technology 2, because a structure is employed in which translational motion applied to the frame portion 3 by the piezoelectric element 4 is transformed into rotational motion centering on the X axis rotation supporting bodies 2 of the micro mirror 1, it is necessary to shift the center of gravity position of the micro mirror 1 relative to the torsion bars.

Moreover, the device also needs to have a certain thickness not only in the X-Y axial directions, but also in the Z axial direction, so that it is difficult for this device to be manufactured with a slender thickness.

Moreover, the optical scanning device of the above-described Conventional technology 3 has the drawback that a large torsion angle cannot be formed in the movable portion 2.

Namely, if a piezoelectric film is formed in the two narrow cantilever beam portions which support the two torsion bars protruding from the frame portion, then the rigidity of this portion increases and vibration which is induced in the piezoelectric film is not transmitted efficiently to the torsion bars. As a result, the torsional vibration of the mirror is reduced. Moreover, unless the vibration characteristics of the vibration source portion formed by the two cantilever beam portions and the piezoelectric film which is formed thereon are matched precisely, then the vibration amplitude of the torsional vibration of the mirror becomes suppressed and, at the same time as this, torsion modes other than torsional vibration are superimposed thereon so that accurate laser beam scanning cannot be achieved. Furthermore, in order to increase the drive force for the mirror by increasing the surface area of the piezoelectric film portion, it is necessary to increase the width of the cantilever beam portions. Because of this, an unnecessary two-dimensional vibration mode is generated in the same cantilever beam portion, so that at the same time as the vibration amplitude of the torsional vibration of the mirror is restricted, a vibration mode other than the torsional vibration is superimposed thereon. As a result, there is a problem in that it is not possible to achieve accurate laser beam scanning. Moreover, because the width of the cantilever beams is restricted to a narrow width, the formation of the top portion electrodes which are used to drive the piezoelectric film formed on this portion is made more difficult because of the narrow width, so that problems arise such as the yield during production being greatly affected.

FIG. 25 shows the same case as that of Conventional technology 3, and shows a structure in which a piezoelectric film is formed on two narrow-width cantilever beam portions which support two torsion bars which protrude from a frame portion. The drive efficiency of the mirror portion scan angle was checked by a simulation calculation. The surface where Y=0 was taken as a plane of symmetry, and half of this was used as a model.

FIG. 26 shows the torsion angle of a mirror having a structure in which a piezoelectric film is formed on two narrow-width cantilever beam portions which support two torsion bars which protrude from the frame portion shown in FIG. 25. The drive voltage was set at 1V, while the characteristics of a PZT-5A which are typical parameters were used for the electrical characteristics of the piezoelectric body, while SUS 304 characteristics were used for the material of the scanner frame main body. The torsion angle of the mirror portion was small at only 0.63°.

SUMMARY OF THE INVENTION

It is an object of the invention to provide an optical scanning device in which, using a simple structure, it is possible to efficiently generate torsional vibration in a mirror portion by forming a piezoelectric actuator on a substrate having torsion bars which support a mirror portion using thin-film formation technology such as an aerosol deposition method (may be referred to below on occasion as an 'AD method'), a sputtering method, or a sol-gel method, and by then generating torsional vibration in the mirror portion using the vibration of the substrate.

A description will now be given of the fundamental elements of the principle and device for generating torsional vibration in a mirror portion of the invention in order to achieve the above-described object with reference made to the drawings.

Principle of Generating Torsional Vibration in Mirror Portion

As shown in FIG. 1, the basic structure of the optical scanning device of the invention includes a substrate 10 which is formed by a substrate main body 20 and by two cantilever beam portions 19 and 19 which protrude from both side portions of the substrate main body, torsion bar portions 12 and 12 which are provided between the cantilever beam portions 19 and 19 so as to support a mirror portion 13 from both sides thereof, a drive source 11 which is formed by a piezoelectric film or the like which is provided on the substrate main body 20, and a supporting component 16 which fixes a fixed end portion 21 of the substrate main body which is on the opposite side thereof from the mirror portion 13 side. The torsion bar portions 12 which support the mirror portion 13 extend in a perpendicular direction (i.e., in the X axial direction) relative to the axial direction of the cantilever beam portions 19.

As shown in FIGS. 2A and 2B, when voltage is applied to the drive source 11 which is in the form of a piezoelectric film, deflection is generated in the substrate main body 20 directly beneath the piezoelectric film in conjunction with the deflection of the piezoelectric film, and vibration is generated in the substrate main body 20. Namely, as shown in FIG. 2A, if a positive voltage is applied to the piezoelectric film side, the piezoelectric film stretches, while conversely, as shown in FIG. 2B, if a negative voltage is applied to the piezoelectric film side, the piezoelectric film contracts, thereby generating vibration in the substrate 10.

At this time, the vibration generated in the substrate main body 20 is transmitted from the substrate main body 20 to the cantilever beam portions 19, so that a force is generated which imparts rotational moments to the mirror portion 13 which is in a horizontal state and is supported by the torsion bar portions 12 shown in FIG. 1, thereby inducing torsional vibration therein.

Placement of Drive Source

As described in Conventional example 3, when the drive source 11 is provided on the torsion bar portions 12 and cantilever beam portions 19 which are close to the mirror portion 13, it is not possible to cause the mirror portion 13 to vibrate at a large torsion angle.

In contrast to this, in the invention, by forming a single piezoelectric film that functions as the drive source 11 on the substrate main body 20, the rigidity of the two cantilever beam portions 19 and 19 is lowered and torsional vibration is efficiently induced in the mirror portion 13. At the same time as this, by providing only a single drive source 11 to drive the mirror portion 13, it is possible to solve the above-described problems of the generation of unnecessary vibration modes and of a reduction in amplitude which cause irregularities and the like in the drive source 11. Moreover, by using the above-described two cantilever beam portions 19 and 19 to separate the portion where the piezoelectric film, namely, the drive source 11 is formed from the mirror torsional vibration portion which is formed by the mirror portion 13 and by the torsion bar portions 12 which support the mirror portion 13, the surface area of the piezoelectric film of the drive source 11 can be designed freely irrespective of the width of the cantilever beam portions 19, and it is possible to efficiently impart a large driving force by means of the mirror torsional vibration portion. Furthermore, formation of the electrodes used to drive the piezoelectric film is also easy, so that it is possible to increase the yield during industrial production.

FIG. 3 is a plan view showing the optical scanning device according to the invention which is structured such that one piezoelectric film forming the drive source 11 is formed on the substrate main body 20, wherein the surface where Y=0 is taken as a plane of symmetry, and only half of this is used as a model. The dimensions of the mirror portion 13 and the dimensions of the torsion bar portions 12, the mounting position where the torsion bar portions 12 are mounted on the mirror portion 13 (i.e., the position of the center of gravity of the mirror portion 13), the shape of the substrate 10 as well as the method which is used to support it, and also the thickness and the total value of the surface area of the piezoelectric film which all provide the basic structure of the optical scanning device are made the same as in Conventional technology 3 shown in FIG. 19. This optical scanning device only differs in the position where the piezoelectric film 11 is formed.

FIG. 4 shows the torsion angle of the mirror portion 13 of the device shown in FIG. 3. The drive voltage was set at 1V, while the characteristics of a PZT-5A which are typical parameters were used for the electrical characteristics of the piezoelectric body, while SUS 304 characteristics were used for the material of the scanner frame main body. Basically, the resonance frequency of the invention shown in FIG. 3 is substantially the same as in Conventional technology 3 shown in FIG. 25, however, while the torsion angle of the mirror portion 13 was only 0.63° in Conventional technology 3, in the structure of the invention shown in FIG. 3, it was confirmed to have an approximately 4.3 times greater torsion, namely, the torsion angle was 2.69° (80.7° at a conversion of 30V).

It is also possible to position a plurality of vibration sources on a substrate in order to increase the mirror scan amplitude, however, in this case, because of irregularities in the mounting state due to the characteristics of the vibration sources or the mounting positions, or to the adhesion or film formation, it becomes easy for two-dimensional vibration which is asymmetrical relative to the axis of symmetry in a perpendicular direction relative to the torsion bars supporting the mirror portion to be induced in the substrate, which results in a deterioration in the scanning accuracy of the optical beams due to the torsional vibration of the mirror portion. In contrast to this, in the invention, torsional vibration is induced efficiently in the mirror portion even though there is only one vibration source, and it is possible to largely reduce scan jitter in the optical beams, and suppress product irregularities.

In order to obtain the maximum amplitude in the torsion angle of the mirror portion 13 at a fixed drive voltage, the placement of the drive source 11 on the mirror portion 13 has importance. If the drive source 11 is placed at a position away from the connecting positions where the torsion bar portions 12 which support the mirror portion 13 connect to the cantilever beam portions 19, namely, in a portion of the substrate main body 20, for example, in a center portion of the substrate main body 20, then it is possible to cause the mirror portion 13 to vibrate with a large torsion angle.

Furthermore, if vibration is generated when the drive source 11 is placed at a position away from the connecting positions where the torsion bar portions 12 which support the mirror portion 13 connect to the cantilever beam portions 19, then the drive source 11 is positioned such that the minimum amplitude of the substrate vibration (i.e., the bottom point of the vibration) is obtained in the vicinity of the connecting positions where the torsion bar portions 12 which support the mirror portion 13 connect to the cantilever beam portions 19.

Moreover, if the connecting portions between the cantilever beam portions 19 and the substrate main body 20 are positioned in the vicinity of the maximum amplitude of the substrate vibration which is excited in the substrate main body 20 by the drive source 11, then it is possible to cause the mirror portion 13 to vibrate at an even larger torsion angle.

One method of matching together the vibration modes of the torsion bar portions 12 and 12 which support the mirror portion 13 from both sides thereof is, for example, to place the drive source 11 in the center in the transverse direction (i.e., on the Y axis in FIG. 1), of the substrate main body 20, and to make the distances from the drive source 11 to the torsion bar portions 12 and 12 on the left and right sides the same.

Resonance Frequency

As shown in FIG. 1, in order to transmit vibration energy generated at a position separated from the mirror portion 13 of the invention as energy which efficiently generates torsional vibration in the mirror portion 13, it is necessary to considerably set the resonance frequency (fm) of the mirror portion 13 which is mainly determined by the mass of the mirror portion 13 and by the spring constant of the torsion bars 12 away from the resonance frequency (fb) which includes the division oscillation mode of the substrate 10 itself. When the drive source 11 of the optical scanning device is driven so as to match the resonance frequency (fm) of the torsional vibration of the mirror portion 13, then if a resonance mode is also induced in the substrate 10, the vibration energy generated by the vibration source becomes distributed between torsional vibration of the mirror portion 13 and two-dimensional division vibration of the substrate 10 due to the law of conservation of energy. Accordingly, the amplitude (i.e., the torsion angle) of the torsional vibration of the mirror portion 13 becomes smaller by the amount of vibration energy from the drive source 11 which is consumed by the two-dimensional division vibration of the substrate 10, so that it becomes impossible to efficiently drive the optical scanning device.

Moreover, if unnecessary two-dimensional division vibration is induced in the substrate 10, then there are cases in which a vibration mode other than pure torsional vibration which has the torsion bars 12 as its axis of rotation becomes superimposed on the mirror portion 13 position at the distal end of the substrate 10, so that it becomes impossible to achieve an optical scan having a high level of accuracy in the rectilinear scan performance thereof. In contrast to this, as shown in FIG. 5, the invention is designed such that the torsional resonance frequency a (fm (n): n=0, 1, 2, . . . ) which includes elements up to the higher orders induced in the mirror portion does not overlap with the torsional resonance frequency b (fb (n): n=0, 1, 2, . . . ) which includes elements up to the higher orders induced in the frame portion. Thickness and Surface Area of Film Body of Piezoelectric Film and the like forming Drive Source The thickness and size of the film body of the piezoelectric film and the like forming the drive source 11 which causes the mirror portion 13 to vibrate must be set at the optimum values in accordance with the thickness and size of the substrate main body 20.

When the conditions in which the optical scanning device will be used are considered, based on a constant drive voltage (i.e., voltage applied to the piezoelectric film), the thinner the film body, the greater the displacement which can be obtained. In actuality, particularly in a film which is formed using an AD method, the characteristics of a piezoelectric film which is formed on a metal substrate show a dependency on the film thickness, namely, if the film is too thin, there is a deterioration in the piezoelectric characteristics and a deterioration in film characteristics such as an increase in leakage current and the like, while if the film is too thick, polarization processing becomes difficult. Moreover, when considering the flatness of the mirror when it is in operation and the mirror sizes required for applications such as projector devices, assuming that the substrate is formed from Si or stainless steel, then a thickness that is greater than or equal to at least 10 μm is required in the substrate 10. In consideration of these points, the optimum thickness of the film body of the piezoelectric film or the like which is suitable for driving an optical scanning device is appropriately less than or equal to 6 times the thickness of the substrate main body 20. A lower limit for the thickness of the film body is approximately 1 μm, and, at this time, it is possible to obtain the maximum mirror portion scan angle with the minimum drive voltage and power consumption for film thickness of the same surface area.

Moreover, if the surface area of the piezoelectric film or the like forming the drive source 11 is such that, in the above-described film thickness range, the length of the film body in the direction in which the vibration is propagated over the substrate is within a range that is smaller than approximately ½ the wavelength of the vibration which is decided by the resonance frequency driving the optical scanning device and the acoustic velocity of the substrate material, then driving can be efficiently performed. Furthermore, within this range, when considering power consumption, it is desirable for the surface area of the drive source 1 to be the same as or smaller than the substrate main body 20. More preferably, the surface area of the drive source 11 is less than or equal to ¾ the surface area of the substrate main body 20.

Position of Center of Gravity of Mirror Portion

When the mounting positions of the torsion bars 12 which support the mirror portion 13 of the optical scanning device are shifted from the position of the center of gravity of the mirror portion 13 in a perpendicular direction relative to the axis of the torsion bar portions 12, then, as shown in FIG. 6, two resonances f1 and f2 exist, namely, a torsional resonance mode centered on the bar axis (i.e., on the X axis), and a torsional resonance mode centered on the position of the center of gravity (Xm) of the mirror portion 13. At this time, there is a slight difference between the two resonance frequencies f1 and f2, and the amplitude of the angle of the torsional vibration (i.e., the optical scan angle) of the mirror in the vicinity of the resonance frequency is not the same when the drive frequency approaches the resonance frequency from the low frequency side and when it approaches the resonance frequency from the high frequency side, and a large hysteresis is generated. In actual use, this hysteresis presents considerable problems. For example, a case in which the mechanical constant of the optical scanner is changed by variations in the environmental temperature, which leads to a change in the resonance frequency which, in turn, leads to variations in the optical scan angle might be considered, however, control to compensate for these variations can normally be performed by changing the drive frequency applied to the piezoelectric film 11. However, if the aforementioned hysteresis is present, extremely complex control is required because of the non-linearity of the hysteresis, and such control is not practical. In contrast to this, if the position of the center of gravity of the mirror portion 13 is matched to the torsion bar support position, the aforementioned hysteresis does not appear, and excellent resonance characteristics can be obtained.

Cross Section of Torsion Bar Portion

The cross section of the torsion bar portions 12 supporting the mirror portion 13 is ideally an axially symmetrical circle. However, in the actual manufacturing thereof, because it is formed from a plate material, it has a limited width and has a rectangular cross section. Because of this, if the width (W) of the bars is too large, then with even a slight processing error, a phenomenon occurs in which the position of the axis of the torsion bar portions 12 moves within the width (W) when resonating. Therefore, a hysteresis phenomenon occurs in the amplitude of the torsion angle (i.e., the optical scan angle) for drive frequencies in the vicinity of the resonance frequency, as described above, so that drive control is difficult. In order to solve this type of problem, it is necessary to keep the width of the torsion bars under a certain width. From experiments, it has been found that if the length of the torsion bar portions is $T_1$ and the substrate thickness is $T_2$, then it is necessary for W to be within a range of $W/T_1 \leq 0.4$ or $0.05 \leq T_2/W \leq 2$, and it is preferable if $W/T_1 \leq 0.2$ or $0.1 \leq T_2/W \leq 0.5$.

Method for Forming Piezoelectric Film

If an aerosol deposition method is used to form the piezoelectric film then, because this is a low-temperature, high-speed process, it is possible to easily form a thick film of several microns or more directly on a metal substrate in a short time. However, the film formation method is not limited to this, and if a material having a heat-resistant temperature, for example, such as a silicon substrate is used, then using conventional thin-film technology such as a sputtering process, CVD process, or Sol-gel process or the like, it is possible to form an epitaxially grown high-performance piezoelectric thin-film. This is useful for forming even more precise optical scanning devices.

Supporting Substrate

In the substrate 10, if the fixed end portion 21 on the opposite side of the substrate main body 20 from the mirror portion 13 side is fixed to and supported in cantilever fashion by the supporting component 16, then the torsion amplitude of the mirror portion 13 can be increased. In this case, the width of the fixed end portion 21 which is fixed by means of the supporting component 16 is suitably within a range of 1/20 to ¾ the width of the substrate main body 20. More preferably, this width is within a range of 1/10 to ½ the width of the substrate main body 20.

If the width of the fixed end portion 21 on the opposite side of the substrate main body 20 from the mirror portion 13 side is made narrower than the width of the substrate main body 20, and this fixed end portion 21 is fixed to and supported in cantilever fashion by the supporting component 16, then it is possible to more efficiently generate vibration in the substrate main body 20 using the drive source 11, and it is possible to increase the torsion amplitude of the mirror portion 13.

It has been confirmed that the narrower the width of the fixed end portion 21, the greater the torsion angle of the mirror portion 13 tends to be. In this case, the width of the fixed end portion 21 which is fixed by means of the supporting component 16 is suitably within a range of 1/20 to ¾ the width of the substrate main body 20. If the width is less than 1/20 the width of the substrate main body 20, then this is too narrow from practical aspects, and the fixing becomes unstable.

FIG. 7 shows various substrate shapes.

For example, PART (a) of FIG. 7 shows a case in which the fixed end portion 21 is the same as the width of the substrate main body 20. In this case, the torsion angle of the mirror portion 13 is 35°. When, however, the overall width of the fixed end portion 21 is narrower than the width of the substrate main body 20, as shown in PART (b), (c), and (d), then it is possible to obtain a high mirror torsion angle that is greater than or equal to 40° in the mirror portion 13 from the same drive voltage.

Moreover, it was found that not only is the overall width of the fixed end portion 21 important, but also the shape thereof is important as well. For example, if the width of the fixed end portion 21 was made smaller by cutting rectangular notches out of the left and right sides of the substrate main body 20 in the vicinity of the fixed end portion 21 as shown in PART (b) of FIG. 7 (referred to as an H shape), the torsion angle was 46°. If the width of the fixed end portion 21 was made smaller by cutting triangular notches out of the left and right sides of the substrate main body 20 in the vicinity of the fixed end portion 21 as shown in PART (c) of FIG. 7 (referred to as an Y shape), the torsion angle was 54°. It is thus possible to more efficiently generate vibration in the substrate main body 20 using the drive source 11, and increase the torsion amplitude of the mirror portion 13. In these cases, the overall width of the fixed end portion 21 may be set to ⅛ to ½ the width of the substrate main body 20.

Moreover, placing a portion of the fixed end portion 21 in a center portion of the substrate main body 20 makes it possible to cause the mirror portion 13 to vibrate at a large torsion angle. For example, when the position of a portion of the fixed end portion 21 was not placed in the center of the substrate main body 20 as shown in PART (e) of FIG. 7, the torsion angle of the mirror portion 13 was 43°. However, when a portion of the fixed end portion 21 was also in a position in the center of the substrate main body 20 as shown PART (d) of FIG. 7 (referred to as a spectacle frame shape), the torsion angle of the mirror portion 13 was 54°.

Even when the fixed end portion 21 is the same as the width of the substrate main body 20, by changing the support mode by which the supporting component 16 fixes the fixed end portion 21 of the substrate main body 20, the fixing stability of the optical scanning device can be further improved.

FIGS. 8A to 8C show examples of three support modes.

FIG. 8A shows an example in which the entire surface of one side of the substrate main body 20 is supported by the supporting component 16. In this case, the torsion angle of the mirror portion 13 was 45°.

FIG. 8B shows an example in which the entire surface of one side of the substrate main body 20 and both sides continuous with this are supported by the supporting component 16. In this case, the torsion angle of the mirror portion 13 was 43°. Because the vibration generated in the substrate main body 20 by the drive source 11 is not very large in the both-side portions on the opposite side of the substrate main body 20 from the mirror portion 13 side (see FIG. 12), even if the both-side portions of the fixed end portion 21 are fixed by the supporting component 16, there is substantially no effect on the torsion amplitude of the mirror portion 13. In the case of FIG. 8B, because there is a substantial length fixing the substrate 10, in actual use, it is possible to further increase the fixing stability of the optical scanning device. In this case, the angle θ of the triangles cut into the supporting component 16 may be within a range of between 30° and 300° within a plane.

A further method of fixing the substrate 10 to the supporting component 16 is to clamp the substrate main body 20 from above and below so as to provide stable fixing. However, there are cases in which, when the clamp portion is a flat surface, uniform contact pressure is not applied to the fixed end portion of the substrate main body, so that unnecessary resonance is generated and sufficient fixing cannot be achieved. Therefore, as shown in FIG. 8C, if the cross-sectional configuration of the clamp portion is formed as a curved surface, then slight bending tension acts in the vicinity of the fixed end portion of the substrate main body 20. As a result, uniform pressure is applied to the contact surface between the substrate main body 20 and the supporting component 16, and a more stable fixing is possible. In experiments, it was found that when the clamp portion was a flat surface, the torsion angle of the mirror portion 13 was 30°, however in the case of the curved surface shown in FIG. 8C, the resonance frequency was stabilized and the torsion angle of the mirror portion 13 could also be increased to 54°.

The cross-sectional configuration of the clamp portion is not limited to the above-described curved surface, and may also be a triangular configuration which imparts a slight bend to the substrate main body portion.

The optical scanning device of the invention has a basic structure in which the substrate main body 20 shown in FIG. 1 is supported in a cantilever fashion by a supporting component 16 on the opposite side from the mirror portion 13. Because of this, if a vertical disturbance vibration is applied to the entire optical scanning device, then the entire optical scanning device vibrates, and optical beams which are reflected and scanned by the mirror portion 13 are affected by this vibration and do not vibrate stably, so that the problem arises that it is not possible to guarantee an accurate optical scan. Accordingly, assuming that the optical scanning device will be used in practical applications such as in portable devices and the like, it is necessary to improve this instability with the entire optical scanning device having a cantilever structure.

Therefore, as shown in FIG. 9, in the invention, the optical scanning device is fixed by means of narrow-width substrate connecting bars 23 to an extremely rigid substrate fixing frame 22, which is positioned so as to surround the entire cantilever-supported optical scanning device, at positions separated from the fixed end portion 21 of the optical scanning device.

At this time, the resonance state of the optical scanning device itself changes depending on the fixing positions of the substrate connecting bars 23, and the scan angle and resonance frequency of the mirror portion 13 are affected.

FIGS. 10 and 11 show the results when this state was examined. As shown in a PART (a) of FIG. 10, if the optical scanning device is fixed by the substrate connecting bars 23 at the base of cantilever beam portions 12 whose vibration amplitude close to the middle of the vibration is large when the mirror portion 13 is in torsional resonance state, then the scan amplitude of the mirror portion 13 is considerably reduced, namely, by approximately 17° compared to a scan amplitude of approximately 53° which is obtained when the optical scanning device is not fixed. This is because if a large portion of the vibration amplitude is fixed at the outer peripheral portion of the optical scanning device so that this vibration is suppressed, then the vibration mode of the entire optical scanning device substrate 10 is changed, which results in it becoming impossible to efficiently transmit energy to the torsional vibration of the mirror portion 13.

In contrast to this, in the state shown in FIG. 11 in which the substrate connecting bars 23 are not connected, when the mirror portion 13 is in torsional resonance state, if, as shown in PART (d) of FIG. 10, the optical scanning device is connected and fixed by the substrate connecting bars 23 in a portion in the vicinity of a bottom point 25 where a vibration amplitude in the Z axial direction of the edge portion of the optical scanning device substrate 10 (i.e., a portion indicated by the symbol 24 in FIG. 11) is at the minimum, then the scan amplitude of the mirror portion 13 becomes a slightly larger scan amplitude, namely, approximately 55°, than when it is not fixed to the substrate fixing frame 22. In this case, because the vibration mode of the entire optical scanning device substrate 10 is not changed, it is possible to maintain a substantially equivalent resonance state compared with when the optical scanning device is not fixed, and any effects on the scan amplitude of the mirror portion 13 of the optical scanning device substrate 10 which has been fixed by the substrate connecting bars 23 are kept to a minimum.

Accordingly, if the optical scanning device is fixed via the outer edge portion of the optical scanning device by means of the substrate connecting bars 23 at the bottom point of the vibration when the mirror is resonating, or at the point where the vibration amplitude is the smallest and which is also furthest away from the optical scanning device supporting component 13, then it is possible to stably support the optical scanning device against any external disturbance vibration without attenuating the scan amplitude of the mirror portion 13.

When the scan jitter and optical face tangle error (i.e., the stability of the beam scanning speed) of the optical beams in the above-described optical scanning device of the invention were evaluated by a MEMS scanner measurement system (ALT-9A44) manufactured by ALT Ltd., it was found that while scan jitter of a conventional silicon MEMS optical scanner (manufactured by Nippon Signal) was Jp-p: 0.2 to 0.3%, irrespective of the fact that the optical scanning device of the invention was formed from a metal material, the scan jitter at scan resonance frequencies of 6 kHz, 16 kHz, and 24 kHz was smaller by a factor of 10, namely, Jp-p: 0.06%. It was thus possible to achieve a high-accuracy optical beam scan which equated to conventional polygon mirror technology. Moreover, in conventional polygon mirror technology, the optical face tangle error is approximately Wp-p: 30 to 40 seconds, and it is necessary to apply correction using an f-$\Theta$ lens or the like and lower the value by a factor of 10. However, in the optical scanning device of the invention, the optical face tangle error is approximately Wp-p: 5 seconds which is a lower value by a factor of 10, so that it is possible to achieve a highly stable beam scanning speed without a correction lens system, so that reductions in both size and cost can be achieved easily. From the above-described measurement results, it is evident that the optical scanning device of the invention makes it possible to obtain an excellent optical beam scanning accuracy which can be used in a laser printer and the like.

The invention was achieved on the basis of the above-described findings and a summary thereof is as follows.

(1) The optical scanning device of the invention includes: a substrate main body; two cantilever beam portions which protrude from both-side portions of one side of the substrate main body; a mirror portion whose both-sides are supported by torsion bar portions between the cantilever beam portions; a drive source which causes the substrate main body to oscillate; and a light source which projects light onto the mirror portion, where the mirror portion resonates and vibrates in accordance with a vibration imparted to the substrate by the drive source, and the direction of reflection light from the light projected onto the mirror portion from the light source changes in accordance with the vibration of the mirror portion, and where a fixed end portion of the substrate main body which is located on the opposite side thereof from the mirror portion side is fixed to a supporting component, and the drive source is provided on a portion of the substrate main body.

(2) Moreover, in the optical scanning device of the invention, in the above-described (1), a width of the fixed end portion of the substrate main body is within a range of 1/20 to 3/4 of the width of the substrate main body.

(3) Moreover, in the optical scanning device of the invention, in the above-described (1) or (2), the fixed end portion of the substrate main body is formed by leaving in place at least a center portion in the transverse direction of the substrate main body.

(4) Moreover, in the optical scanning device of the invention, in the above-described (1) to (3), the fixed end portion of the substrate main body is fixed by being gripped from above and below, and a cross-sectional configuration of the fixed end portion is formed in a curved surface shape or in a folded shape.

(5) Moreover, in the optical scanning device of the invention, in the above-described (1) to (4), the drive source is configured by forming a film body constituted of a piezoelectric film, a magnetostrictive film, or a permanent magnet film directly on a substrate, and a thickness of the film body is less than or equal to 6 times the thickness of the substrate.

(6) Moreover, in the optical scanning device of the invention, in the above-described (1) to (5), the surface area of the film body is less than or equal to 3/4 the surface area of the substrate main body.

(7) Moreover, in the optical scanning device of the invention, in the above-described (1) to (6), connecting portions between the torsion bar portions and the cantilever beam portions are provided in the vicinity of the minimum amplitude of the substrate vibration (i.e., the bottom point of the vibration) which is excited in the substrate main body by the drive source.

(8) Moreover, in the optical scanning device of the invention, in the above-described (1) to (7), connecting portions between the torsion bar portions and the cantilever beam portions are set so as to be positioned in the vicinity of the maximum amplitude of the substrate vibration which is excited in the substrate main body by the drive source.

(9) Moreover, in the optical scanning device of the invention, in the above-described (1) to (8), the resonance frequency of the mirror portion which is determined by a mass of the mirror portion and by the spring constant of the torsion bars is set by a large amount away from the resonance frequency of the substrate.

(10) Moreover, in the optical scanning device of the invention, in the above-described (1) to (9), a substrate fixing frame is placed so as to surround the substrate main body and cantilever beam portions and is fixed on the fixed end portion side of the substrate main body, and the substrate main body and the substrate fixing frame are connected together by means of substrate connecting bars at a position away from the supporting component and also in the vicinity of the minimum amplitude of the substrate vibration.

The invention which has the above-described features generates vibration which is induced by means of a drive source in a substrate which supports a mirror portion, and causes rotational moment to be generated in the mirror portion from this vibration, and using a resonance phenomenon causes a large torsion amplitude to be generated in the mirror portion.

EFFECTS OF THE INVENTION

The invention provides the excellent effects described below.

(1) By supporting both sides of a mirror portion using torsion bar portions between two cantilever beam portions which protrude from two end sides of a substrate main body, and fixing the end portion of the substrate main body located on the opposite side from the mirror portion side, and by also providing a drive source in a portion of the substrate main body, it is possible to provide a high-performance optical scanning device which has a fast scanning speed that is greater than or equal to 5 kHz and has a large amplitude optical scan angle that is greater than or equal to 20°. Moreover, torsional vibration is possible in the mirror portion irrespective of whether the mirror portion is supported at the center of gravity thereof or at a position away from the center of gravity thereof. Furthermore, it is possible to achieve a simplification of the structure and a reduction in manufacturing costs. In addition, it is possible to impart a large vibration to the mirror portion using only a small-sized vibration source. Furthermore, it is possible to considerably reduce the power consumption of the piezoelectric element forming the vibration source. Moreover, because there is an increased degree of freedom in the placement of the piezoelectric element, it is possible to achieve a reduction in both the size and the thickness of the optical scanning device.

(2) By fixing the fixed end portion of the substrate main body located on the opposite side thereof from the mirror portion side within a range of $1/20$ to $3/4$ the width of the substrate main body, and by forming the cross-sectional configuration of the fixed end portion in a curved shape or in a bent shape, and by making the thickness of the film body less than or equal to 6 times the thickness of the substrate, and by making the surface area of the film body less than or equal to $3/4$ the surface area of the substrate main body, it is possible to obtain an optical scanning device which has a superior fast scanning speed and large amplitude optical scan angle.

(3) By placing the connecting portions where the torsion bar portions which support the mirror portion connect to the cantilever beam portions in the vicinity of the minimum amplitude (i.e., the bottom point of the amplitude) of the substrate vibration excited in the substrate main body by the film body, it is possible to impart a large rotational moment to the mirror portion and efficiently excite torsional vibration.

At this time, in order to excite torsional vibration in the mirror portion, it is necessary for the adjacent distance between the above-described bottom point of the vibration, which is the minimum amplitude of the substrate vibration, and the connecting portions to be less than or equal to $\pm 1/4$ the plate wave wavelength ($\lambda$). In addition, in order to suppress variations in the optical path of the optical system which are due to the shafts of the torsion bar portions supporting the mirror portion vibrating vertically to a minimum and to a practical level, and obtain a large torsional vibration in the mirror portion, it is desirable for the above-described adjacent distance to be less than or equal to $\pm 1/6$, and even more desirably to be less than or equal to $\pm 1/8$.

(4) Furthermore, by providing the connecting portions between the substrate portion and the cantilever beam portions 19 which support the torsion bar portions 12 which are connected to the mirror portion 13 in the vicinity of the maximum amplitude of the substrate vibration (i.e., in the middle of the vibration) which is excited by the drive source in the substrate main body, it is possible to efficiently impart excitation energy to the cantilever beam portions, and impart a large rotational moment to the mirror portion, and efficiently excite torsional vibration.

(5) By setting by a considerable amount the resonance frequency of the mirror portion which is determined by the mass of the mirror portion and by the spring constant of the torsion bars away from the resonance frequency of the substrate, it is possible to transmit vibration energy generated at a position separated from the mirror portion efficiently as energy which generates torsional vibration in the mirror portion.

(6) By positioning a substrate fixing frame so as to surround the substrate main body and cantilever beam portions and then fixing it on the fixed end portion side of the substrate main body, and by connecting together the substrate main body and the substrate fixing frame by means of substrate connecting bars at a position away from the supporting component and also in the vicinity of the minimum amplitude of the substrate vibration, it is possible to stably support the optical scanning device against external disturbance vibration without attenuating the scan amplitude of the mirror portion.

BRIEF DESCRIPTION OF THE DRAWINGS

FIG. 7 is a view showing various substrate shapes.

FIGS. 8A to 8C are views showing three examples of substrate support modes.

FIG. 13 is a view showing a projected image of an operating beam of Example 1 according to an embodiment of the invention.

FIG. 18 shows vibration which is excited in the surface of the optical scanning device shown in FIG. 11, Part (a) of FIG. 18 is a plan view while Part (b) of FIG. 18 is a perspective view.

FIG. 22 is a view showing Conventional technology 1 with the top side being a plan view and the bottom side being a frontal cross-sectional view thereof.

DESCRIPTION OF THE PREFERRED EMBODIMENTS

The best embodiments for implementing the optical scanning device according to the invention will now be described based on examples with reference made to the drawings.

Example 1

Figure 12:
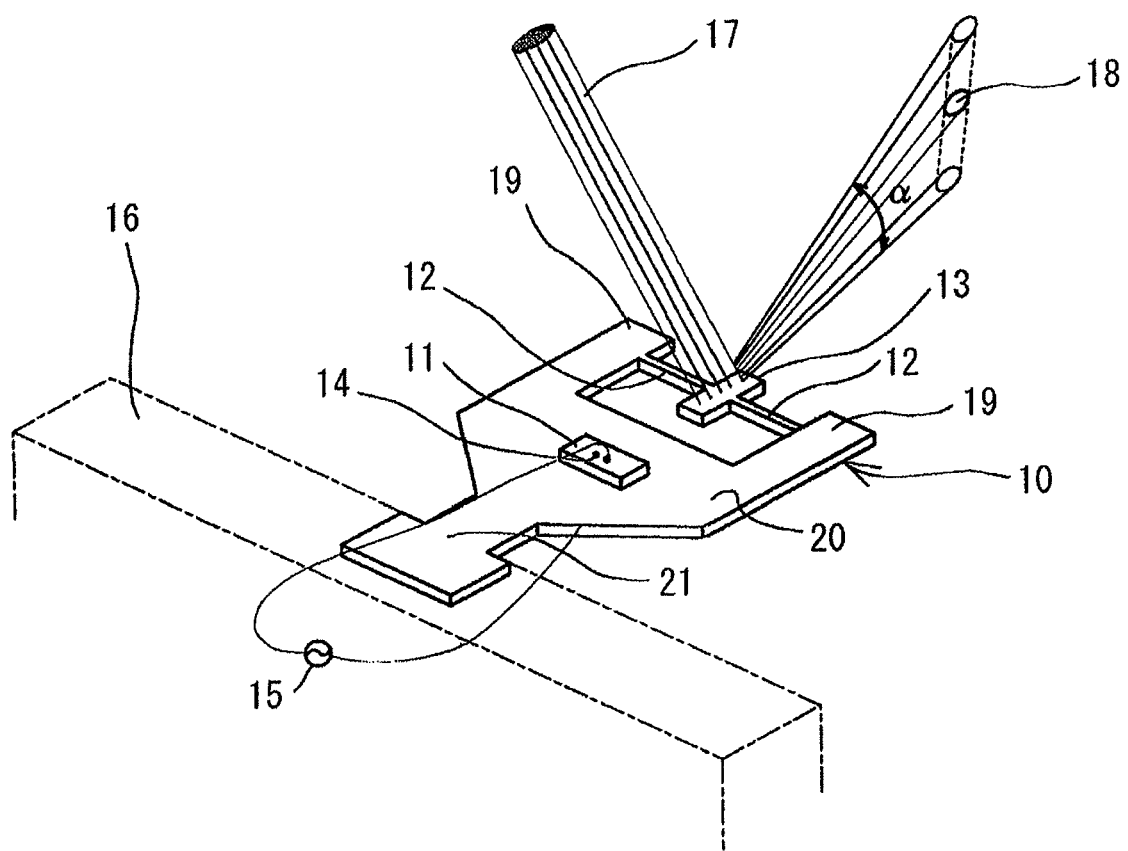
FIG. 12 is a perspective view showing Example 1 according to an embodiment of the invention.

FIG. 12 is a perspective view showing an optical scanning device according to Example 1.

A substrate 10 is manufactured by etching or by press working a square plate material of SUS 304 having a thickness of 30 or 50 μm such that the substrate 10 is cut out so as to leave torsion bar portions 12 and a mirror portion 13 remaining. The substrate 10 is formed by a substrate main body 20 and cantilever beam portions 19 and 19 which protrude in parallel with each other from two sides of one side of the substrate main body 20. The torsion bar portions 12 which support the mirror portion 13 are provided extending in an orthogonal direction relative to the axial direction of the two cantilever beam portions 19 and 19.

A fixed end portion 21 which is located on the opposite side from the mirror portion 13 side of the substrate main body 20 is fixed by means of a supporting component 16, so as to form a structure in which the substrate 10 is supported in cantilever fashion by the supporting component 16. In this example, both sides of the substrate main body 20 are cut out in triangular shapes so that the fixed end portion 21 is formed in the center portion of the substrate main body 20, and the substrate 10 is formed in a Y shape. Moreover, the width of the fixed end portion 21 may be within a range of 1/20 to 3/4 the width of the substrate main body 20.

A piezoelectric film 11 is formed directly without using an adhesive agent in a central portion of the substrate 10 using a mask film forming method which is based on a known AD method invented by the inventor was of the invention.

The piezoelectric film 11 is formed, for example, from lead zirconate titanate (PZT) which is a typical piezoelectric material.

The method for forming the piezoelectric film 11 directly on the substrate 10 using a known AD method will be briefly described.

Lead zirconate titanate (PZT) having a particle diameter of approximately 0.5 μm is mixed with gas so as to form an aerosol. This is then jetted at high speed from a nozzle onto predetermined locations on the substrate 10 so as to form a film. When the film is being formed, a large mechanical impact is generated in the PZT fine particles as a result of the PZT fine particles colliding with the substrate 10, so that breakage of the PZT fine particles occurs at the same time as the generation of a newly formed surface, and a dense film is thus formed. The piezoelectric film 11 which is formed in this manner has ferroelectric properties. After the piezoelectric film 11 has been formed, a heat processing is performed in air at 600° C. for 10 minutes. A top portion electrode 14 is then formed, for example, by gold sputtering on the surface of the piezoelectric film 11. It is possible to downsize and simplify the structure by forming the top portion electrode 14 using an AD method subsequent to the film formation of the piezoelectric film 11 instead of employing gold sputtering.

Figure 1:
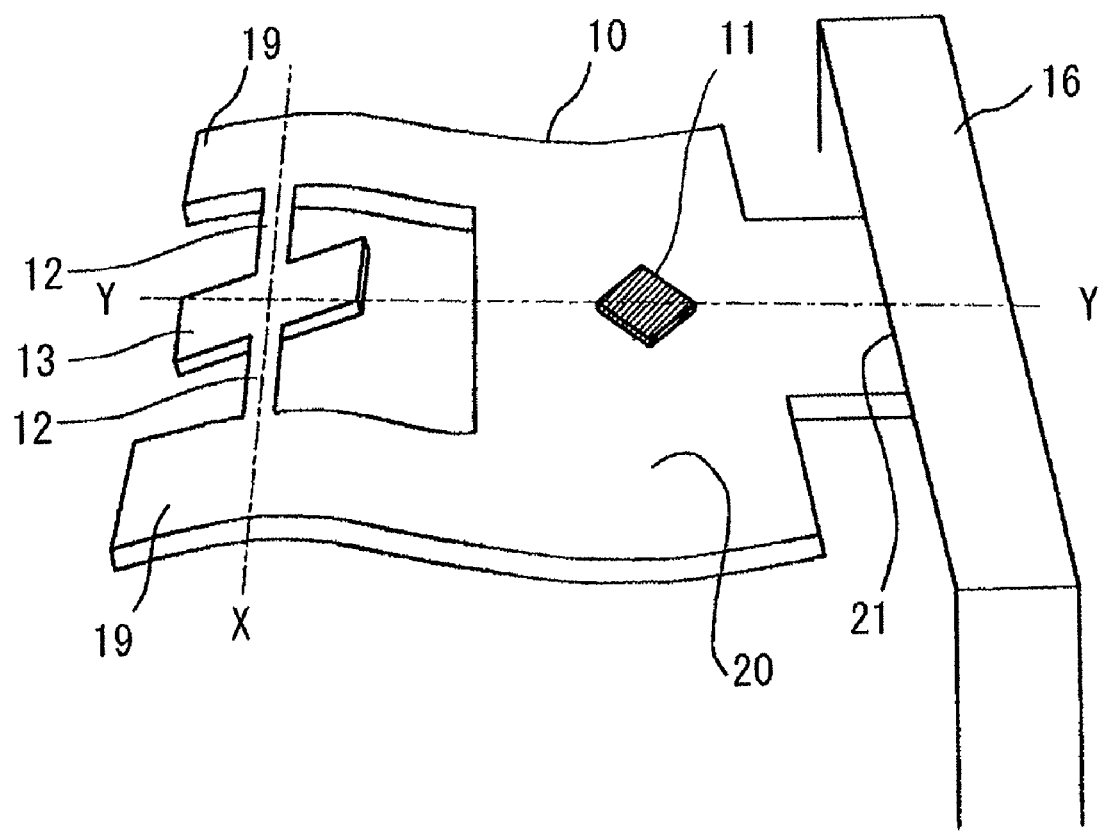
FIG. 1 is a conceptual view illustrating basic elements of the invention.
Figure 2A:
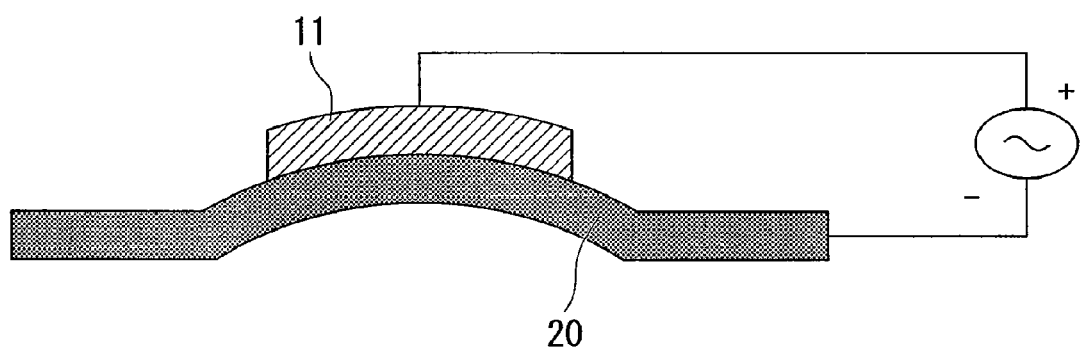
FIGS. 2A and 2B are conceptual views illustrating the vibration generation principle of the invention.
Figure 2B:
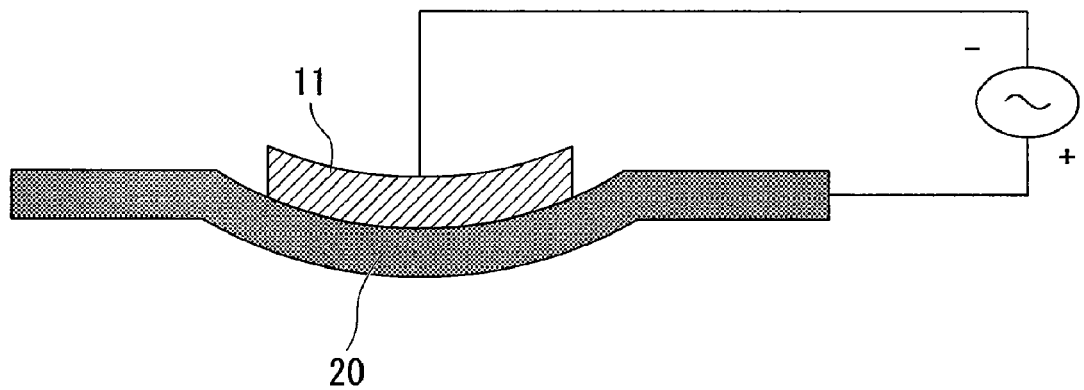
Figure 3:
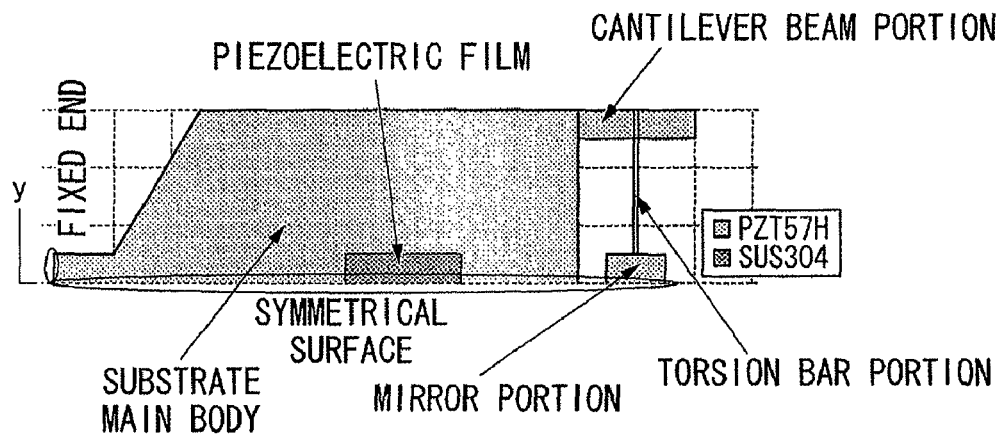
FIG. 3 is a plan view of an optical scanning device of the invention which has a structure in which a single piezoelectric film is formed on a substrate main body, with a surface where Y=0 being taken as a plane of symmetry, and with half of this being used as a model.
Figure 4:
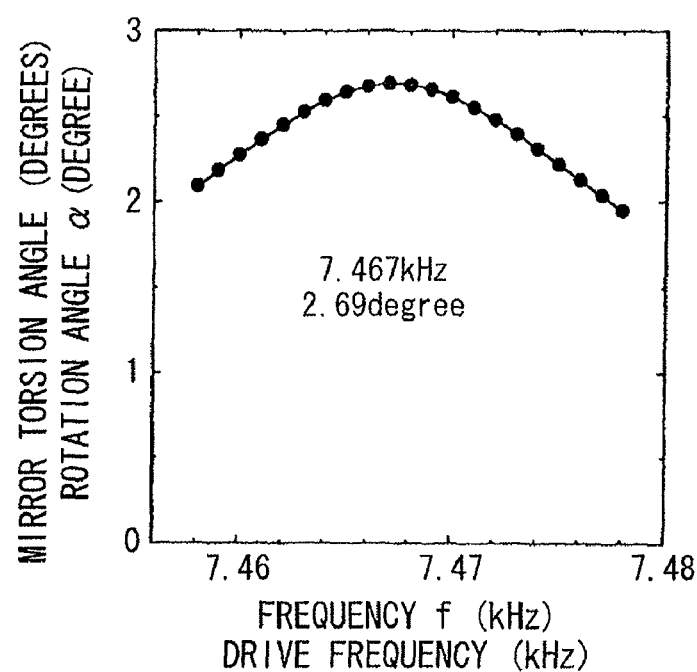
FIG. 4 is a view showing a torsion angle of a mirror portion of the device shown in FIG. 3.
Figure 5:
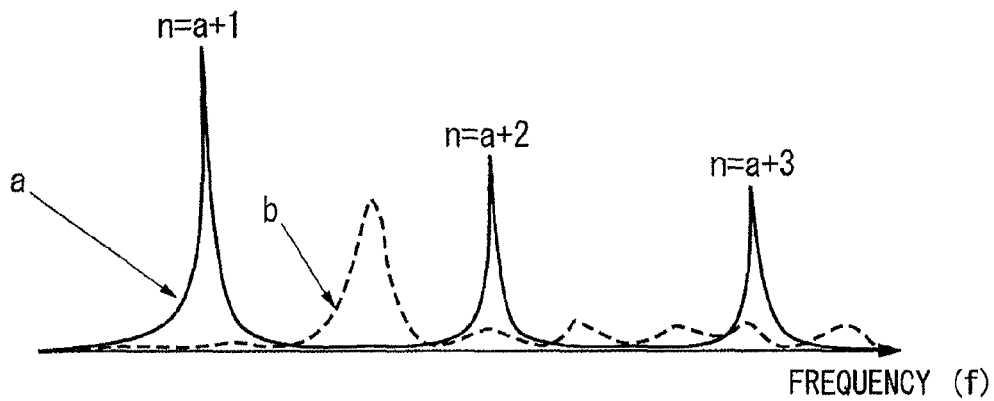
FIG. 5 is a view showing resonance frequencies of the substrate and mirror portion of the optical scanning device according to the invention.
Figure 6:
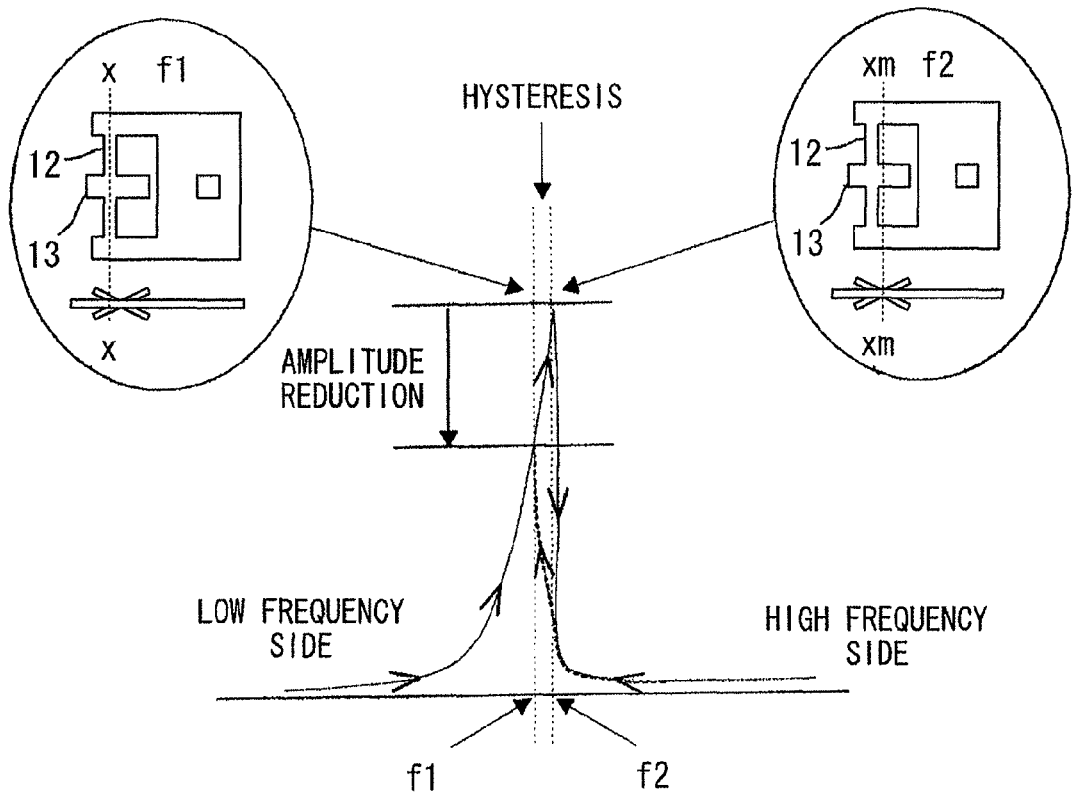
FIG. 6 is a view illustrating circumstances in which a large hysteresis is generated when the center of gravity of the mirror portion is shifted in the vertical direction from the axis of the torsion bar portions both when the drive frequency approaches the resonance frequency from the low-frequency side, and when the drive frequency approaches the resonance frequency from the high frequency side.
Figure 9:
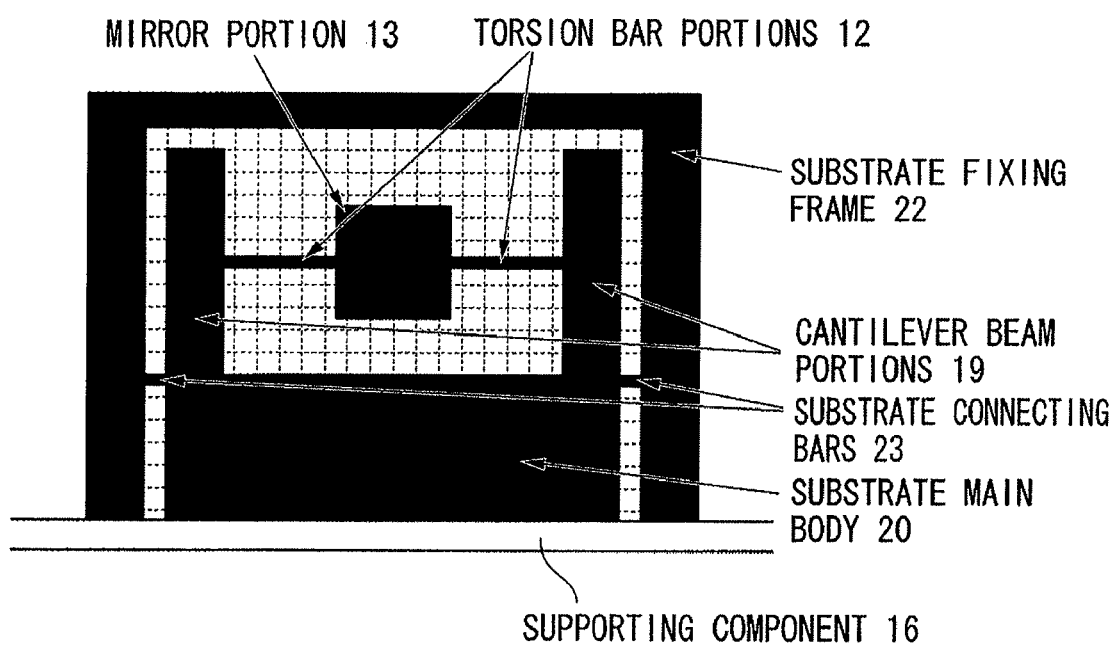
FIG. 9 is a plan view of a device in which a substrate fixing frame has been positioned so as to surround the substrate main body and cantilever beam portions according to the invention.
Figure 10:
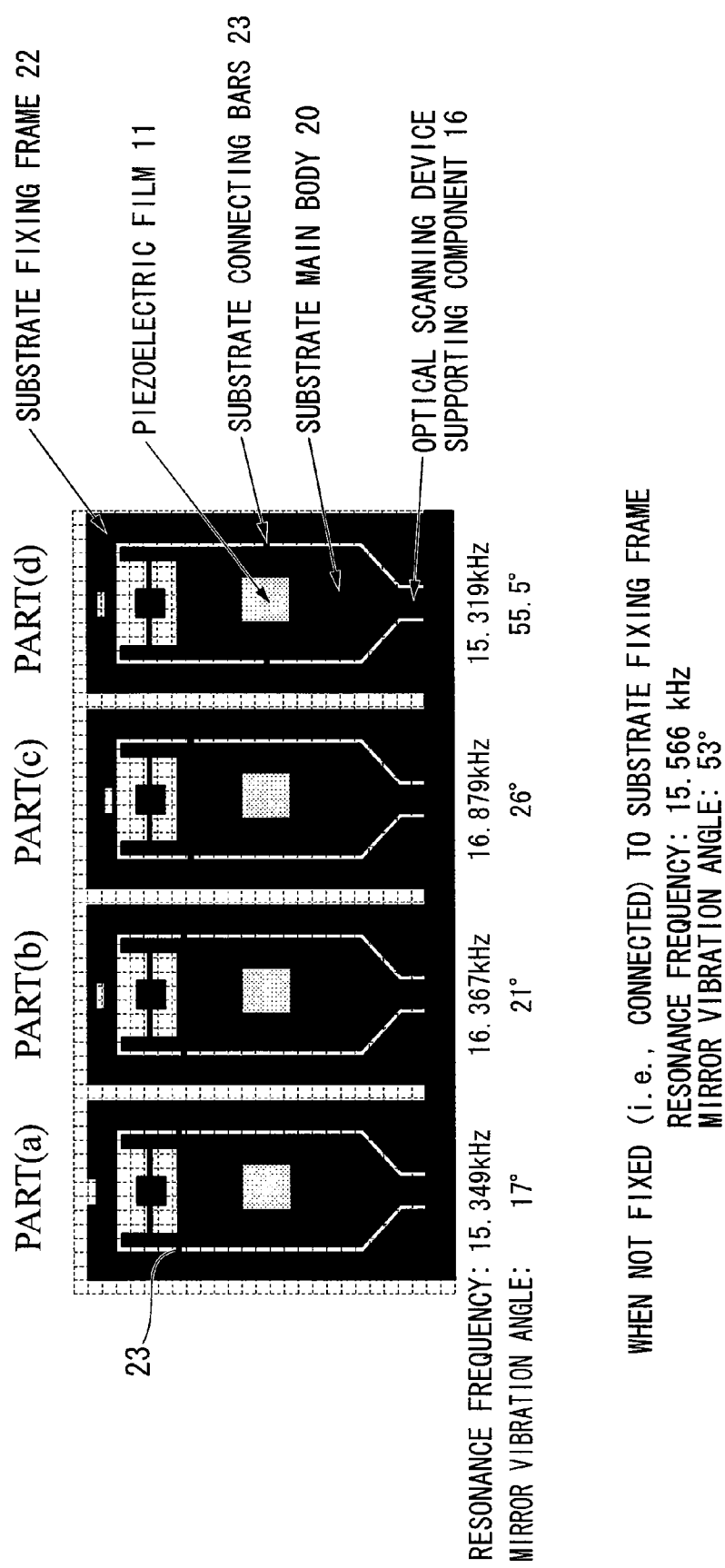
FIG. 10 is a view illustrating mirror torsion angles when the position of substrate connecting bars which connect together a substrate and a substrate fixing frame was changed.
Figure 11:
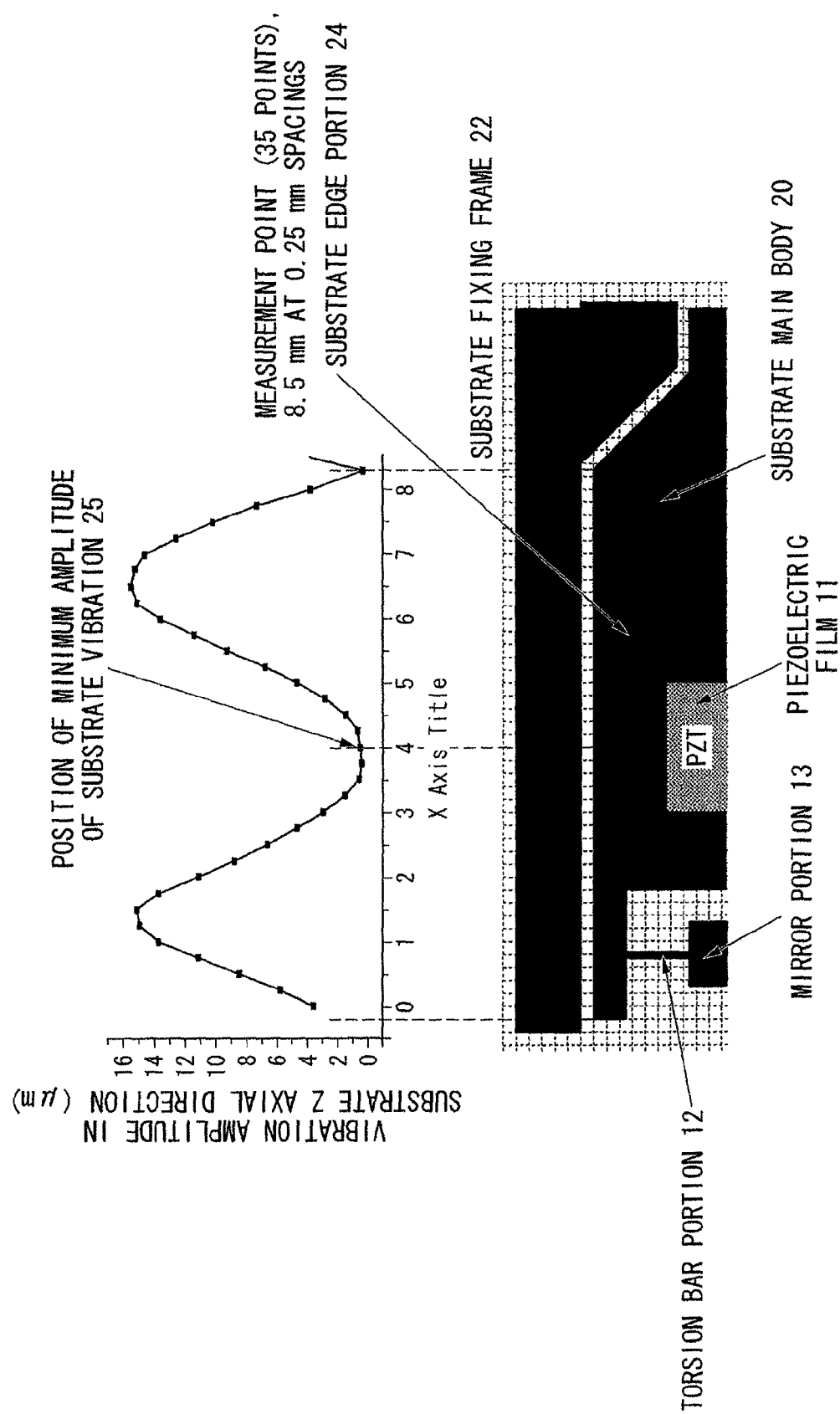
FIG. 11 is an view illustrating a state of the vibration amplitude of an edge portion of a substrate when the mirror portion is in torsional resonance state when the substrate and the substrate fixing frame are not connected by substrate connecting bars.

The piezoelectric film 11 is formed at a position away from the connecting portions where the torsion bars 12 which support the mirror portion 13 are connected to the cantilever beam portions 19, namely, in a portion of the substrate main body 20, for example, in a center portion of the substrate main body 20 as shown in FIG. 12. Furthermore, the piezoelectric film 11 is formed in the vicinity of the minimum amplitude of the vibration generated in the mirror portion 13 on the substrate 10 by the piezoelectric film 11, namely, in a position slightly shifted from the position of the minimum amplitude. Moreover, one method of matching together the vibration modes of the torsion bar portions 12 and 12 which are supporting the mirror portion 13 from both sides thereof is to place the drive source 11 in the center in the transverse direction of the substrate main body 20 (i.e., the Y axis shown in FIG. 1), and make the distances from the drive source 11 to the left and right torsion bar portions 12 the same.

When considering the flatness of the mirror when it is in operation and the mirror sizes required for applications such as projector devices, assuming that the substrate is formed from Si or stainless steel, then a thickness that is greater than or equal to at least 10 μm is required in the substrate 10. The optimum thickness of the film body of the piezoelectric film or the like which is suitable for driving an optical scanning device is appropriately less than or equal to 6 times the thickness of the substrate main body 20. A bottom limit for the thickness of the film body is approximately 1 μm, and, at this time, it is possible to obtain the maximum mirror portion scan angle with the minimum drive voltage and power consumption for film thickness of the same surface area.

Moreover, if the surface area of the piezoelectric film or the like forming the drive source 11 is such that, in the above-described film thickness range, the length of the film body in the direction in which the vibration is propagated over the substrate is within a range that is smaller than approximately ½ the wavelength of the vibration which is decided by the resonance frequency driving the optical scanning device and the acoustic velocity of the substrate material, then driving can be efficiently performed. Furthermore, within this range, when considering power consumption, it is desirable for the surface area of the piezoelectric film forming the drive source 11 to be smaller than the substrate main body 20. More preferably, the surface area of the drive source 11 is less than or equal to ¾ the surface area of the substrate main body 20.

As shown in FIG. 7, the position of the center of gravity of the mirror portion 13 matches the support positions of the torsion bar portions 12. Because of this, it is possible to obtain excellent resonance characteristics without hysteresis being generated both when the drive frequency approaches the resonance frequency from the low frequency side and when it approaches the resonance frequency from the high frequency side.

Moreover, the cross-section of the torsion bar portions 12 supporting the mirror portion 13 is a rectangular shape.

If the width of the torsion bar portions 12 is taken as (W), the length of the torsion bar portions 12 is taken as ($T_1$), and the thickness of the substrate 10 is taken as ($T_2$), then these are set within a range of $W/T_1 \leqq 0.2$ or $0.1 \leqq T_2/W \leqq 0.5$.

Wiring is provided so that voltage can be supplied from the power supply 15 to the formed top portion electrode 14 and the substrate 10 which serves as a bottom portion electrode.

When the voltage is applied to the substrate 10 and the top portion electrode 14, the piezoelectric film 11 generates a piezoelectric vibration, and this vibration generates vibration in the substrate 10. This vibration which is generated in the substrate 10 causes rotational moment to be generated in the mirror portion 13 via the torsion bar portions 12, and causes a large torsion amplitude to be generated in a resonating state.

As shown in FIG. 12, if laser beams 17 are irradiated onto the mirror portion 13 while voltage is still being applied to the substrate 10 which is serving as an electrode and to the top portion electrode 14, the mirror portion 13 vibrates while generating the torsional vibration, and laser light 18 which is reflected by the mirror portion 13 vibrates at a constant torsion angle α.

FIG. 13 is a view showing a projected image of an actual operating beam, and no distortion or blurring can be seen.

The following Table 1 shows the electrical characteristics of a PZT film manufactured using an AD method which is used for driving.

TABLE 1

| Electrical Characteristics of PZT Film | |
|---|---|
| Permittivity (at 1 kHz) | 900 to 1000 |
| Dielectric losses-tan δ (at 1 kHz) | 0.03 to 0.05 |
| Piezoelectric constant, $d_{31}$ | −90 pm/V |
| Density | 7.9 g/cm³ |
| Young's modulus | 80 GPa |

Figure 14:
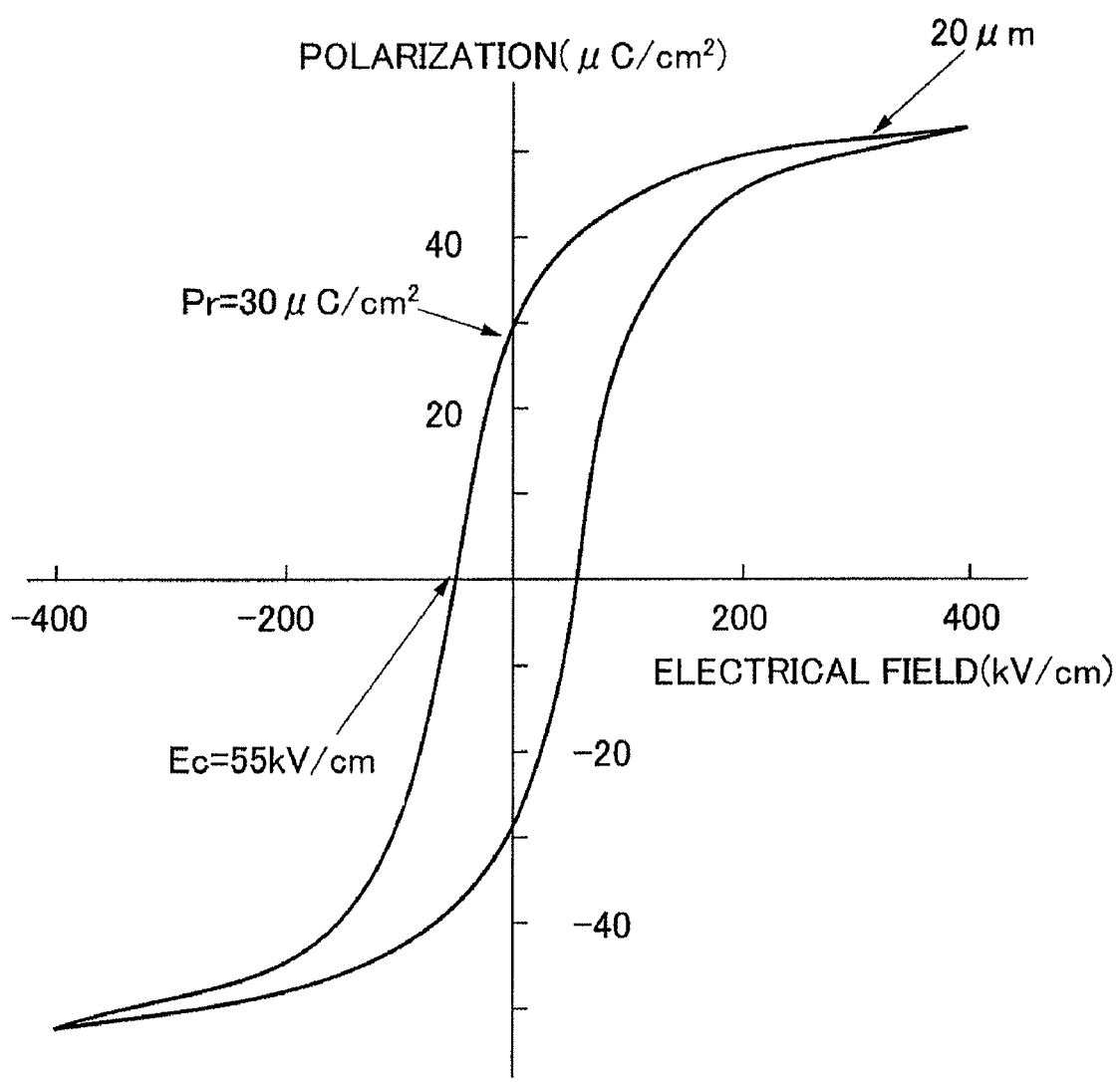
FIG. 14 is a view showing ferroelectric characteristics of a PZT film manufactured by using an AD method which is used to drive Example 1 according to an embodiment of the invention.

Moreover, FIG. 14 shows the ferroelectric characteristics of a PZT film manufactured using an AD method which is used for driving.

Figure 15:
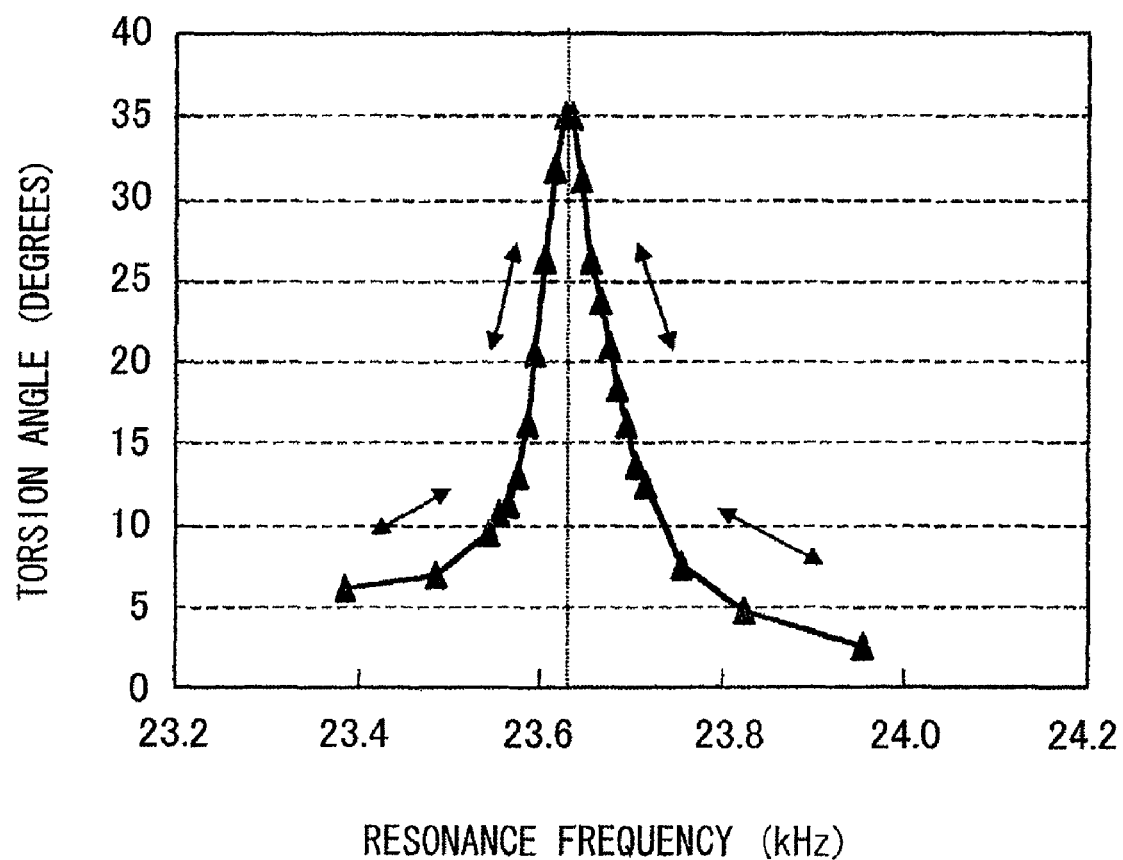
FIG. 15 is a view showing frequency characteristics when the optical scanning device of Example 1 according to an embodiment of the invention is used as a scanner.

FIG. 15 is an example showing frequency characteristics when the optical scanning device manufactured in the manner described above is used as a scanner, in which it was possible to confirm that the primary resonance frequency of the torsional vibration was an extremely high 23.63 kHz, and that high speed operation was possible. In a theoretical calculation in which only the resonance structure of the mirror portion 13 was considered, it was a somewhat high 24.3 kHz. Moreover, the Q value (a value which represents a half value width of the resonance peak and shows sensitivity towards frequency changes) which is a performance index of a resonating optical scanning device was approximately 110, which is less than or equal to 600 of an Si-MEMS scanner, and it was found that, even if there was a variation in the changes of the resonance frequency in response to changes in the surrounding environment temperature, any change in the scanning width of the mirror portion is comparatively small which is appropriate in an optical scanner.

Figure 16:
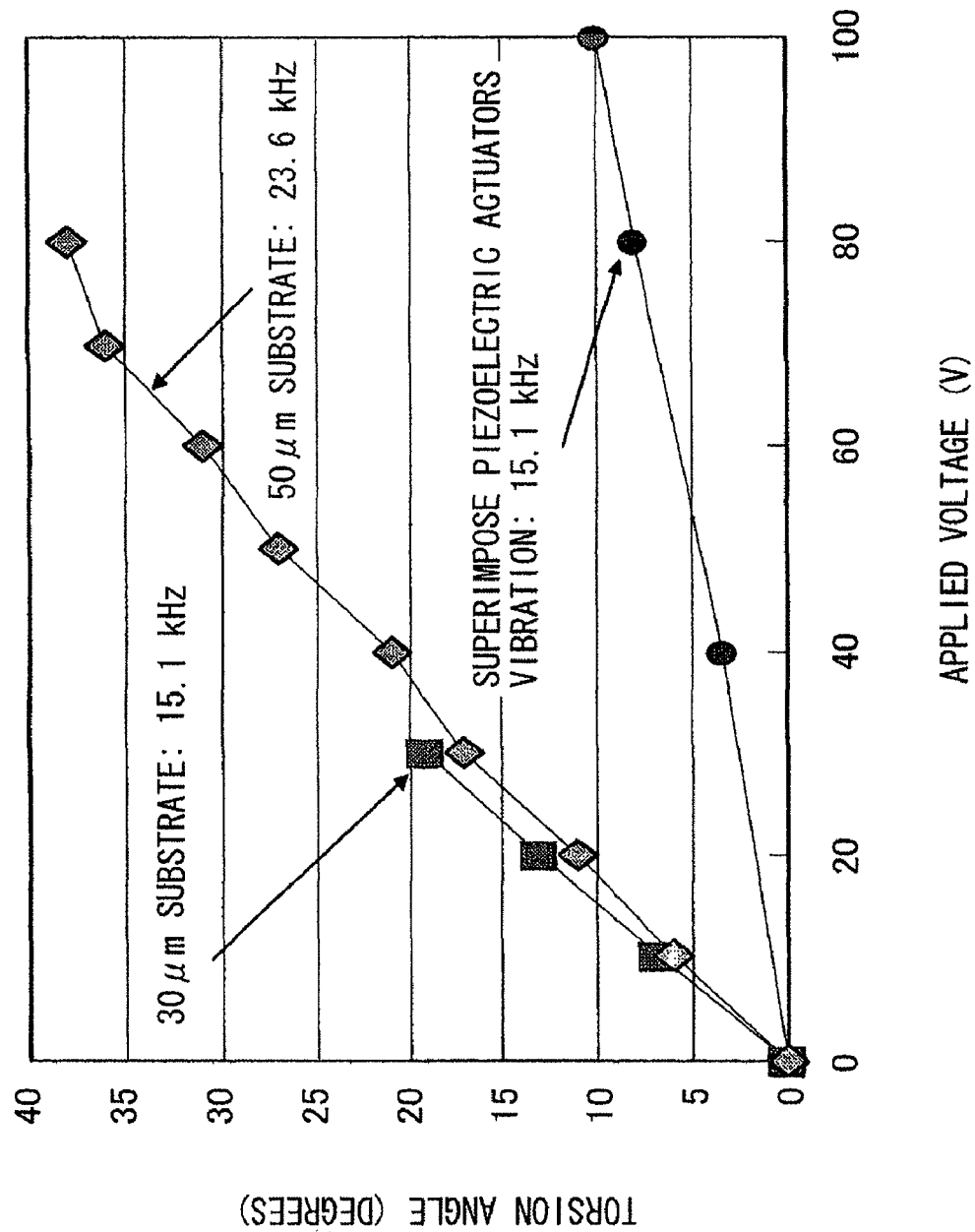
FIG. 16 is a view showing a torsion angle of a scanning beam relative to drive voltage.

FIG. 16 shows the torsion angle of a scanning beam relative to drive voltage.

A comparison was made between a piezoelectric film having a film thickness of 10 μm which was formed using an AD method directly on SUS substrates having thicknesses of 30 μm and 50 μm, and when the adhesion of superimposed actuators was used as a drive source.

When a piezoelectric film having a film thickness of 10 μm formed by means of an AD method was used, a torsion angle of approximately 20° was obtained from a drive voltage of 40V. This is an improvement by a factor of 10 on the resonance frequency of a conventional Si-MEMS scanner.

The difference in plate thickness changes the spring constant of the torsion bar portions supporting the mirror portion, and there is a large change in the resonance frequency, however, it was found that the torsion angle of the mirror portion is not greatly affected.

Moreover, when superimposed actuators adhered using an adhesive agent were used as a vibration source instead of the piezoelectric film formed by means of an AD method, in spite of the fact that the piezoelectric constant was approximately twice that of a piezoelectric film formed using an AD method, the torsion angle, namely, the scan angle of the scanner was less than or equal to half. It is thought that this is because there is a large effect from the absorption of the vibration by the adhesive agent. It was confirmed that the excellent effects were obtained when the piezoelectric film was formed directly on a substrate by means of an AD method.

Figure 17A:
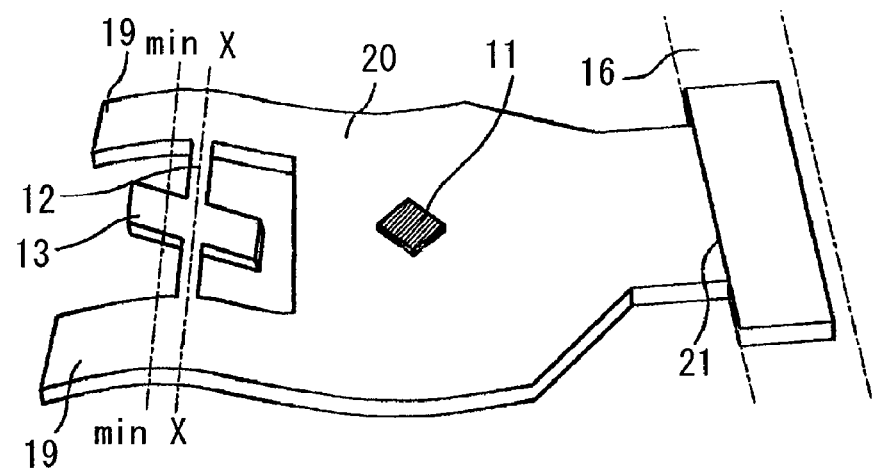
FIGS. 17A to 17C are operational views illustrating a case in which the location of minimum amplitude of substrate vibration is formed in a position which is slightly set from the axis of the torsion bar portions in Example 1 according to an embodiment of the invention.
Figure 17B:
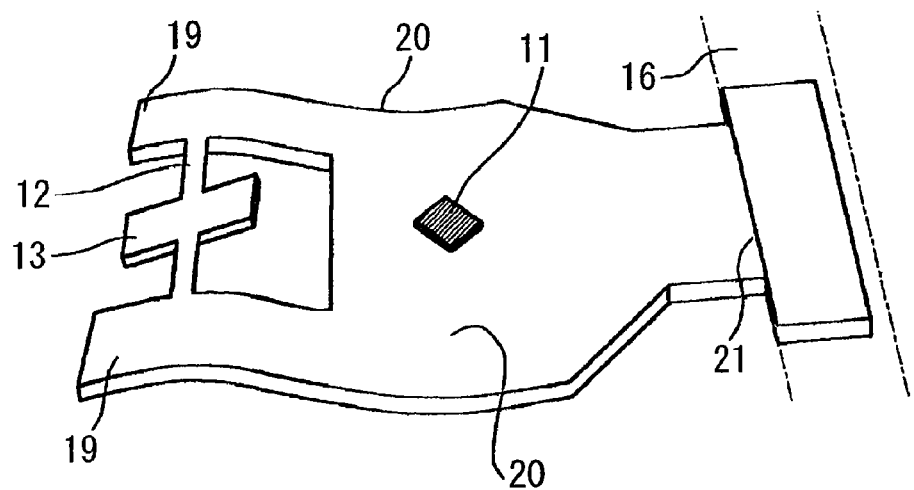
Figure 17C:
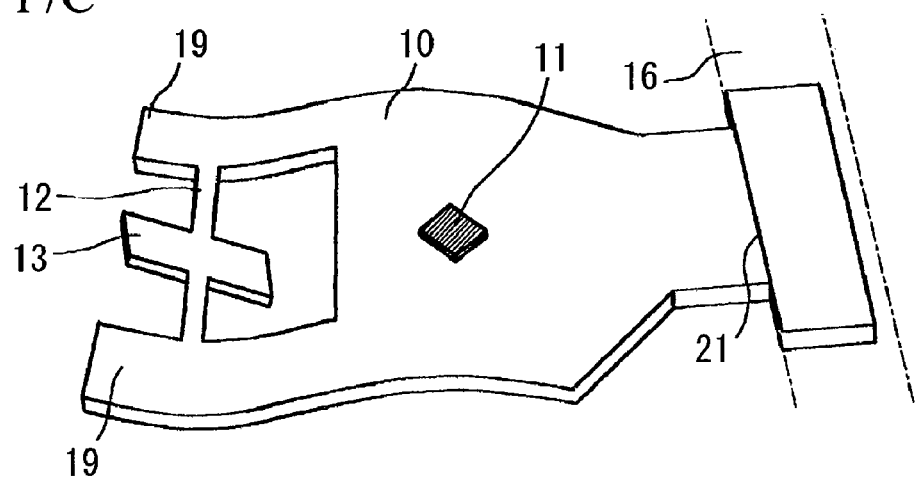

FIGS. 17A to 17C show a case in which the location of the substrate vibration minimum amplitude Amin which is formed in the vicinity of the mirror portion 13 is formed in a position which is slightly shifted from the X-X axis of the torsion bar portions 12 in the device shown in FIG. 12.

Because the two sides portions 19 and 19 which each support an end of the torsion bar portions 12 are formed in a cantilever shape, the portion supporting the torsion bar portion 12 is more easily deformed and, as shown in (b) and (c), it is possible to efficiently impart rotational moment to the mirror portion 13, and it is possible to achieve efficient driving.

Moreover, because the location of the substrate vibration minimum amplitude Amin is formed in a position which is slightly shifted from the X-X axis of the torsion bar portions 12, as shown in the drawings, even if the mirror portion 13 is supported at the position of its center of gravity by the torsion bar portions 12, it is still possible to impart a large rotational moment to the mirror portion 13, and to efficiently excite torsional vibration therein. At this time, in order to excite torsional vibration in the mirror portion, it is necessary for the adjacent distance between the above-described bottom point of the vibration, which is the minimum amplitude of the vibration induced in the substrate main body or in the cantilever beam portions, and the above-described connecting portions to be less than or equal to ±¼ of the wavelength (λ) of the vibration induced in the cantilever beam portions. In addition, in order to suppress variations in the optical path of the optical system which are due to the shafts of the torsion bar portions supporting the mirror portion vibrating vertically to a minimum and to a practical level, and obtain a large torsional vibration in the mirror portion, it is desirable for the above-described adjacent distance to be less than or equal to ±⅙ the wavelength because the bottom point of the vibration is shifted from the above-described connecting portions.

Furthermore, because the cantilever beam portions 19 which support the torsion bar portions 12 which are connected to the mirror portion 13 have a narrower width than that of the substrate main body, and because it is easy for a one-dimensional vibration mode to be induced in the longitudinal direction of these cantilever beam portions, in order to efficiently transmit the two-dimensional vibration generated in the substrate main body to the cantilever beam portions, it is necessary for the connecting portions between the cantilever beam portions 19 and the substrate main body to be provided in the vicinity of the maximum amplitude of the substrate vibration (i.e., in the middle of the vibration) which is excited by the drive source in the substrate main body.

At this time, in order to suppress to a minimum and to a practical level variations in the optical path of the optical system which are due to a vertical vibration of the shafts of the torsion bar portions supporting the mirror portion, and to a large torsional vibration being induced in the mirror portion when the length of the cantilever beam portions is shorter than the vibration wavelength ($\lambda$), it is preferable for the adjacent distance between the middle of the vibration which is induced on the substrate main body and the connecting portion to be between the value that is less than or equal to $\pm \frac{1}{6}$ of the wavelength ($\lambda$) and the value that is greater than or equal to $\pm \frac{1}{8}$ of the wavelength ($\lambda$) in the vibration induced in the substrate main body.

Moreover, when the length of the cantilever beam portions is longer than the vibration wavelength ($\lambda$), the above adjacent distance is held to be less than or equal to $\pm \frac{1}{8}$, and the length of the cantilever beam portions is adjusted so that the adjacent distance between the middle of the vibration, which is the minimum amplitude of the vibration induced in the cantilever beam portions, and the above-described connecting portions is kept to be less than or equal to $\pm \frac{1}{6}$, then the most superior performance can be obtained.

As a result of this, vibration energy can be efficiently transmitted to the cantilever beam portions, and it is possible to impart a large rotational moment to the mirror portion 13, and efficiently excite torsional vibration therein.

FIG. 18 is a confirmation example of when this was actually confirmed, and shows a case in which the vibration displacement distribution generated in the substrate surface when the torsional vibration of the mirror portion 13 was at maximum during resonance was measured using a laser Doppler displacement gauge in synchronization with excitation signals applied to the piezoelectric film 11. The connecting portions between the cantilever beam portions 19 and the torsion bar portions 12 are in the location of the minimum amplitude of the substrate vibration, namely, in the vicinity of the bottom point thereof, and the vibrational displacement was a minimum.

Figure 19:
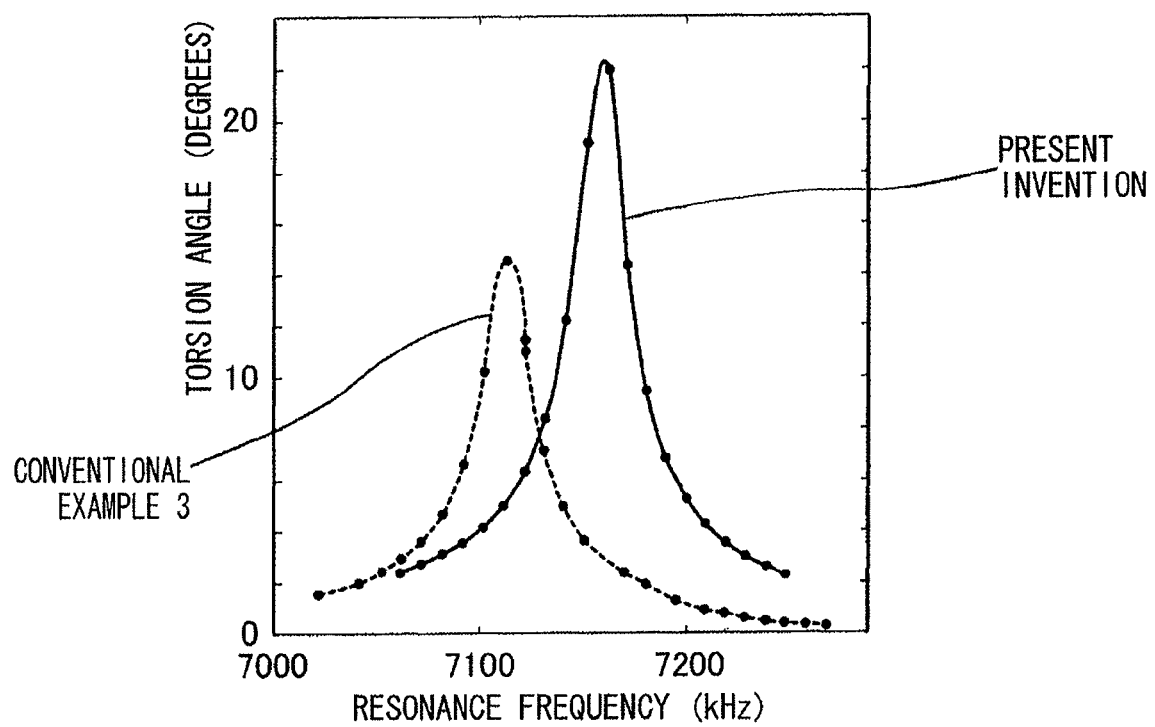
FIG. 19 is a view showing calculated results for resonance frequencies and torsion angles of a mirror portion of the invention and of Conventional example 3.

FIG. 19 shows the calculated results for the torsion angle of the mirror portion and resonance frequency in the invention and in Conventional technology 3. The model used for this calculation was as follows.
Substrate material: SUS 304
Substrate thickness: 50 μm
Thickness of piezoelectric film (PZT 4) used for drive source: 10 μm
Size of mirror portion: 1 mm×1 mm
Width of torsion bar portions: 50 μm
Length of torsion bar portions: 2 mm
Surface area of piezoelectric film: 4 mm$^2$ From FIG. 19, it was found that the torsion angle of the mirror portion of Conventional technology 3 was approximately only 0.6 the torsion angle of the mirror portion of the invention.

Next, simulation results for an operation of the optical scanning device according to the invention performed using a finite element method (FEM) will be described.

Figure 20A:
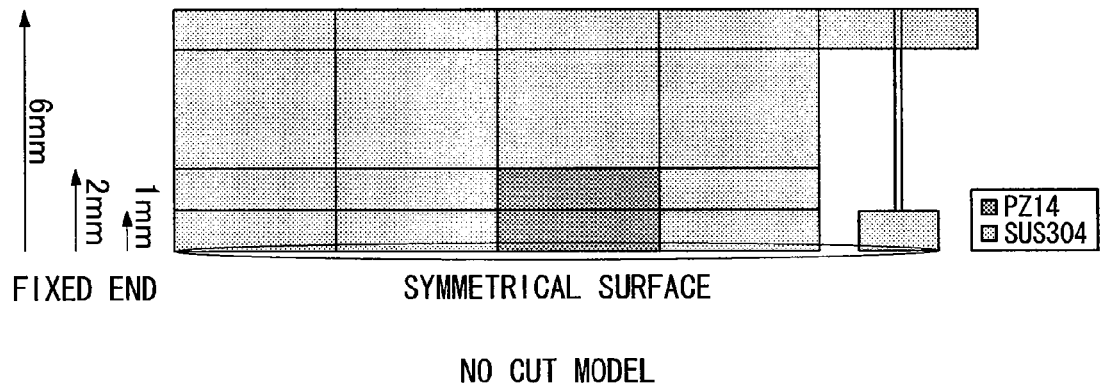
FIGS. 20A, 20B, and 20C are views showing the planar configurations of various optical scanning devices in order to illustrate simulation results of an operation of the optical scanning device according to the invention performed using a finite element method (FEM).
Figure 20B:
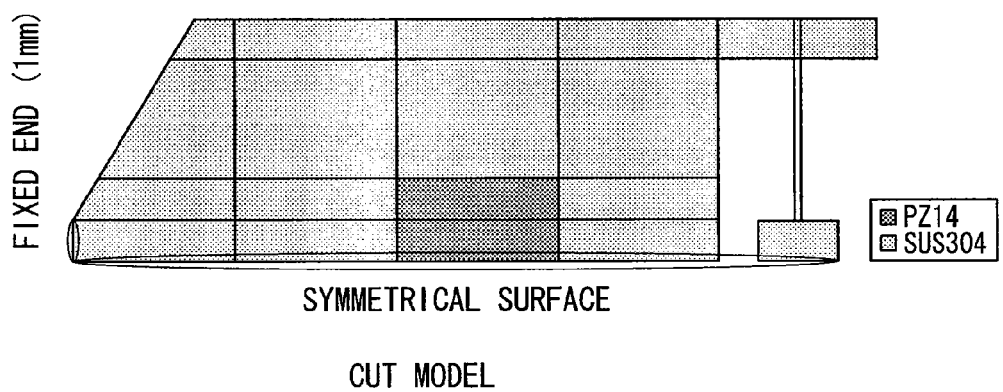
Figure 20C:
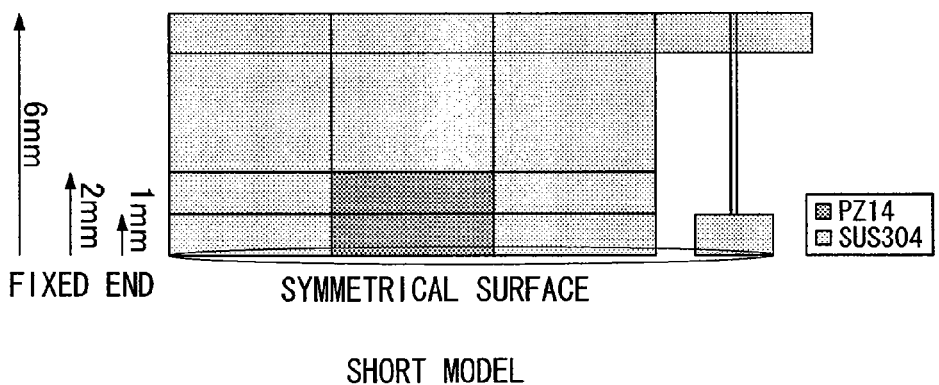

FIGS. 20A, 20B, and 20C are plan views of respective optical scanning devices. As shown in these drawings, in the optical scanning devices having these three shapes, the size of the mirror portion, the length and width of the torsion bar portions, the thickness of the substrate, the materials, and the surface area and the thickness of the piezoelectric film are all the same, and only the shape of the substrate main body and the length of the supporting portion (i.e., the width of the fixed end of portion of the substrate main body) are changed. The size of the drive source (PZT) is 2 mm×2 mm×10 μm (i.e. thickness), the thickness of the substrate (SUS 304) is 50 μm, and the size of the mirror portion is 1 mm×1 mm. Employing symmetry theory, half of each of these optical scanning devices only was used as a model.

In the basic model (i.e., a No cut model) shown in FIG. 20A, in the simulation, the width of the fixed end portion of the substrate main body was changed between 1 mm, 2 mm, and 6 mm (in which the entire fixed end portion was fixed).

Moreover, FIG. 20B shows a model (i.e., a Cut model) in which the width of the fixed end portion is set at 1 mm, and portions of the left and right sides are cut out diagonally from the fixed end portion towards the mirror portion side.

Furthermore, FIG. 20C shows a model (i.e., a Short model) in which, in the basic model shown in FIG. 20A, the length of the substrate main body (i.e., the length from the fixed end portion to the base portion of the cantilever beam portions) is shortened by 2 mm.

Based on these differences in the structure, simulations of the scan angle and resonance frequency of the mirror portion were made.

Figure 21:
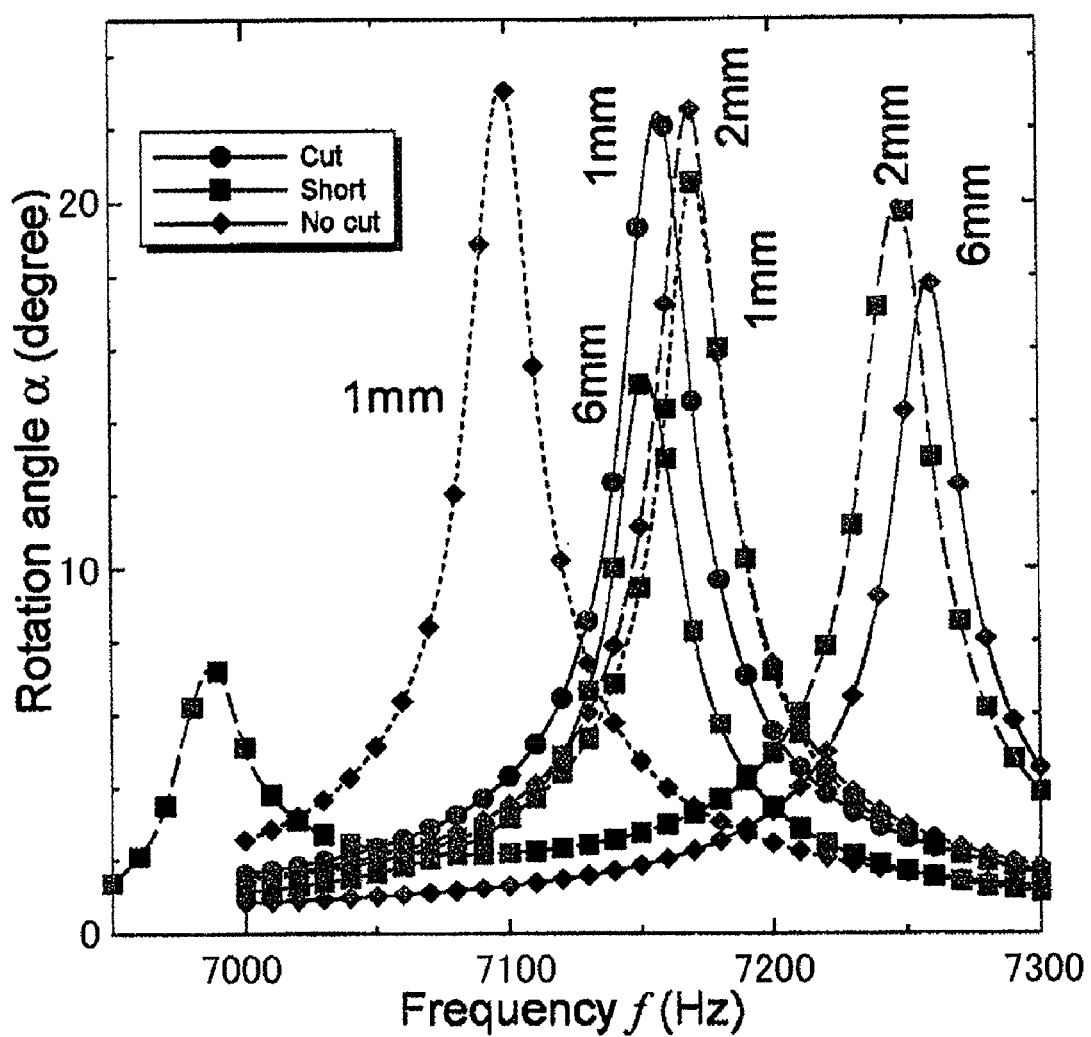
FIG. 21 is a view showing a comparison of scan angles and torsional resonance frequencies of mirror portions in the three models shown in FIG. 14.
Figure 23:
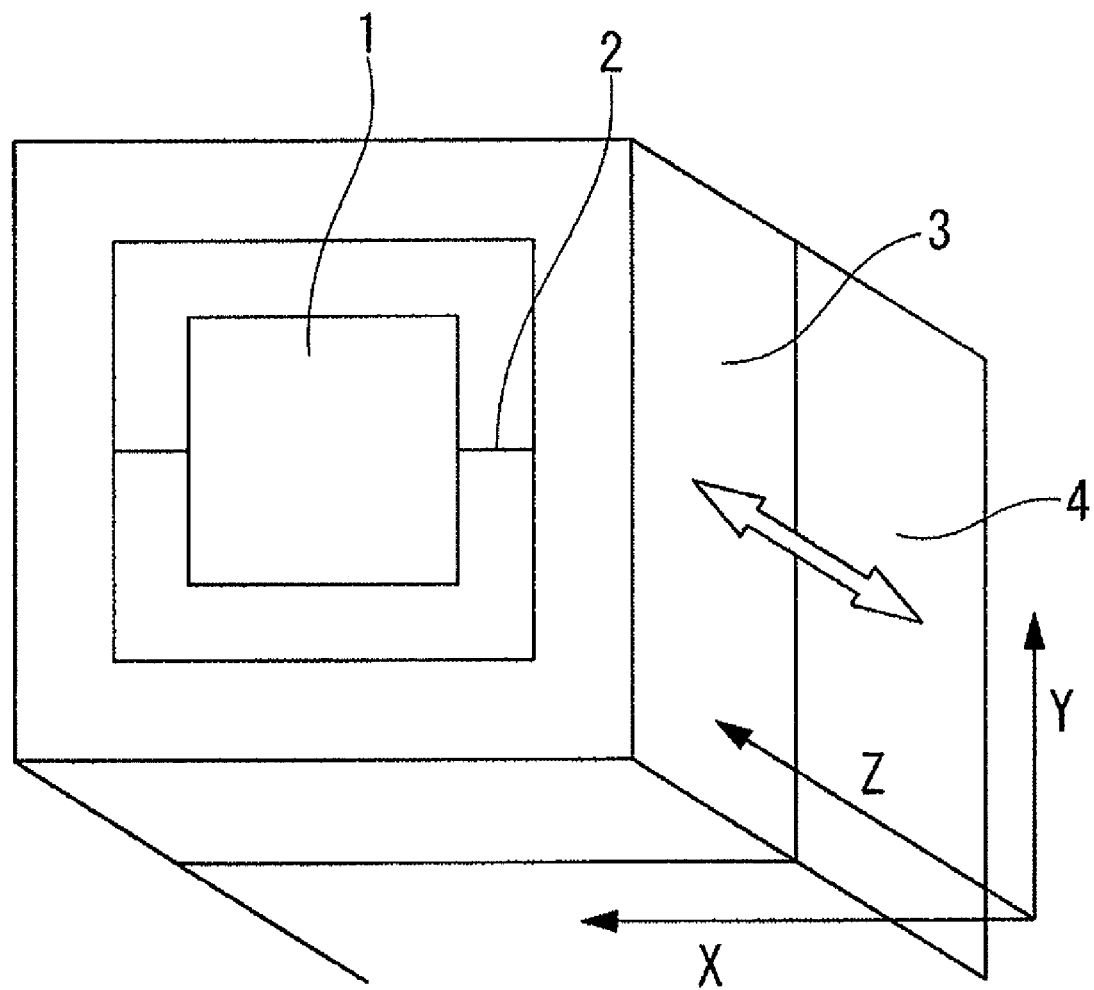
FIG. 23 is a perspective view showing Conventional technology 2.
Figure 24:
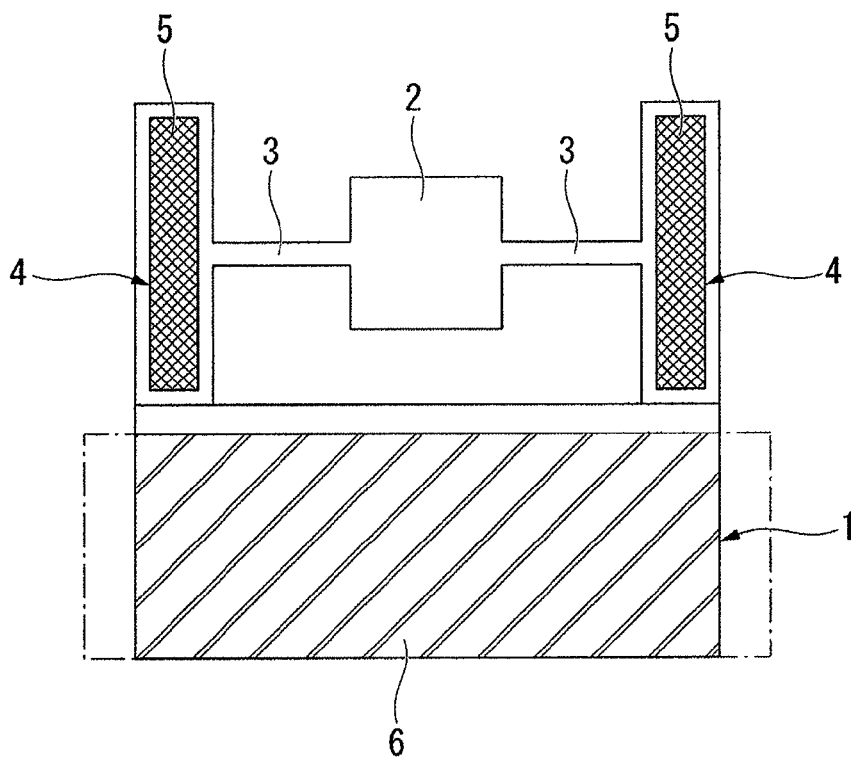
FIG. 24 is a plan view showing Conventional technology 3.
Figure 25:
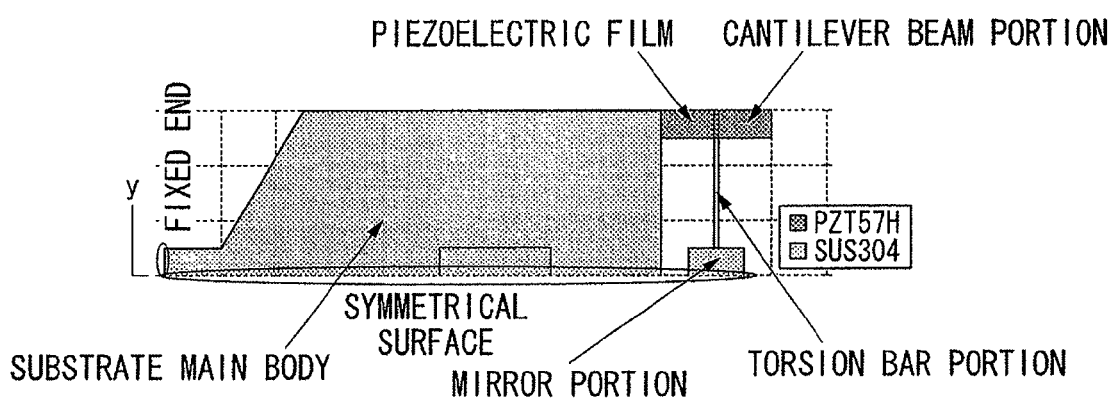
FIG. 25 shows the same type of structure as in the case of Conventional technology 3, with a surface where Y=0 being taken as a plane of symmetry, and with half of this being used as a model.
Figure 26:
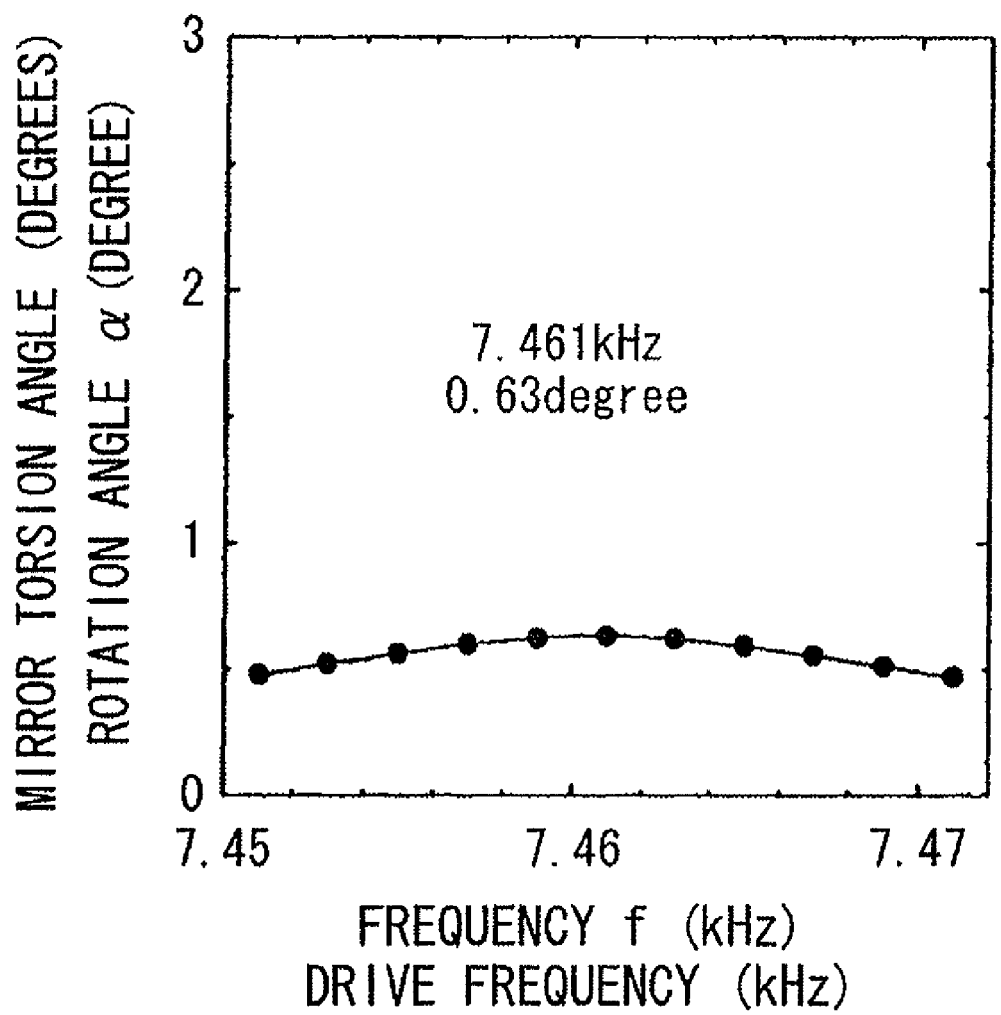
FIG. 26 is a view showing a torsion angle of a mirror portion of a device having the structure shown in FIG. 25.

FIG. 21 shows a comparison of the torsional resonance frequencies and scan angles of the mirror portions in the three models shown in FIGS. 20A, 20B, and 20C.

As shown in FIG. 21, in all of the models it was confirmed that the scan angle of the mirror portion during resonance tended to become larger as the length of the fixed end portion was shortened. This fact is extremely important in the construction of an optical scanning device which is practical and also highly efficient. Moreover, it was also confirmed that there were large changes in the resonance frequency.

When the basic model optical scanning device having a fixed end portion width of 1 mm shown in FIG. 20A was compared with the Cut model optical scanning device having a fixed end portion width of 1 mm shown in FIG. 20B, it was found that the resonance frequency increased from 7100 Hz to 7160 Hz, and that there was substantially no change in the scan angle.

However, in the structure of the optical scanning device of the invention, as a result of changes in the length of the substrate main body (i.e., the length from the fixed end portion to the base portion of the cantilever beam portions) and, in particular, the distance between the drive source and the fixed end portion, changes were evident in both the resonance frequency and the scan angle. Specifically, when the basic model shown in FIG. 20A was compared with the Short model shown in FIG. 20C, it was found that when the length of the substrate main body was shortened from 6 mm to 4 mm, then when the width of the fixed end portion was 1 mm, the resonance frequency increased from 7100 Hz to 7180 Hz, while when the width of the fixed end portion was 2 mm, the resonance frequency increased from 7180 Hz to 7250 Hz and, furthermore, the scan angle decreased slightly from 22.5° to 20°.

Furthermore, when the fixed end portion width was the same as the overall substrate width of 6 mm, conversely, the resonance frequency decreased from 7270 Hz to 7150 Hz, and the scan angle also decreased from 18° to 15°. Moreover, in the Short model in which the length of the substrate main body was 4 mm, at this time another resonance point appeared on the low-frequency side at a lower frequency than 7000 Hz.

The above findings show that the resonance frequency and scan angle of the mirror portion of the optical scanning device of the invention are not decided solely by the spring constant of the mirror portion and torsion bar portions which support the mirror portion on both sides thereof, but are also decided by the size and shape of the substrate portion and also by the width of the fixed end portion and the like. This fact shows that the optical scanning device of the invention is different in principle from conventionally known optical scanning devices which use the resonance principle and which are formed by a mirror portion and by torsion bars which support this mirror portion.

Generally in optical scanning devices which employ a resonance structure, in order to precisely adjust the resonance frequency, or to suppress irregularities occurring during production, accurately ascertaining the causes of changes in the resonance frequency and scan angle which are caused by differences in the length and shape of the substrate main body is extremely important and also effective in the design of practical optical scanning devices.

The formation positions of the middle portion and bottom portion of two-dimensional vibration which is generated by a drive source in the substrate main body where the drive source is formed are changed by differences in the length of the substrate main body and the length of the supporting portions (i.e., the width of the fixed end portion), and this has a huge effect on the scan angle of the mirror portion during resonance. If the connecting portions between the substrate and the cantilever beam portions which support the torsion bar portions which support the mirror portion from both sides thereof are located within the vicinity of the middle portion of this vibration, then a large scan angle can be obtained.

What is claimed is:

1. An optical scanning device, comprising:
    a substrate;
    a supporting component fixing the substrate, the supporting component being fixed to a fixed end portion, the fixed end portion being provided at one end side of the substrate;
    a drive source provided on the substrate, the drive source causing the substrate to oscillate and generating a substrate vibration;
    a pair of cantilever beams which protrude from connecting positions of both-side portions of one side of the substrate;
    a torsion bar provided so as to bridge the connecting positions provided at the cantilever beams;
    a mirror portion whose both-sides are supported by the torsion bar between the cantilever beams, the mirror portion being provided at the other end side of the substrate; and
    a light source projecting light onto the mirror portion, wherein
    the connecting positions between the substrate and the cantilever beams are located in the vicinity of the maximum amplitude of the drive source, and the connecting positions between the cantilever beams and the torsion bar are located in the vicinity of the minimum amplitude of the drive source.

2. The optical scanning device according to claim 1, wherein
    the distance between a bottom point of vibration, which is the minimum amplitude of the substrate vibration, and the connecting positions is less than or equal to ±¼ the plate wave wavelength in order to excite torsional vibration in the mirror portion.

3. The optical scanning device according to claim 1, wherein
    the supporting component fixes the side of the substrate on the opposite side thereof from the mirror portion.

4. An optical scanning device, comprising:
    a substrate;
    a supporting component fixing the substrate, the supporting component being fixed to a fixed end portion, the fixed end portion being provided at one end side of the substrate;
    a drive source provided on the substrate, the drive source causing the substrate to oscillate and generating a substrate vibration;
    a pair of cantilever beams which protrude from connecting positions of both-side portions of one side of the substrate;
    a torsion bar provided so as to bridge the connecting positions provided at the cantilever beams;
    a mirror portion whose both-sides are supported by the torsion bar between the cantilever beams, the mirror portion being provided at the other end side of the substrate;
    a light source projecting light onto the mirror portion;
    a substrate fixing frame placed so as to surround the substrate and the cantilever beam cantilever beams, the substrate fixing frame being fixed on the fixed end portion side of the substrate; and
    substrate connecting bars connecting the substrate and the substrate fixing frame at a position away from the supporting component and in the vicinity of the minimum amplitude of the substrate vibration.

* * * * *